US012743425B2

(12) United States Patent
Sharma

(10) Patent No.: US 12,743,425 B2
(45) Date of Patent: Sep. 22, 2026

(54) HETEROASSOCIATIVE RETRIEVAL-AUGMENTED STORES FOR AI PROCESSING

(71) Applicant: NVIDIA Corporation, Santa Clara, CA (US)

(72) Inventor: Sugandha Sharma, Cambridge, MA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 18/890,191

(22) Filed: Sep. 19, 2024

(65) Prior Publication Data

US 2026/0079943 A1 Mar. 19, 2026

(51) Int. Cl.
*G06F 16/2455* (2019.01)

(52) U.S. Cl.
CPC ................................ *G06F 16/2455* (2019.01)

(58) Field of Classification Search
CPC .................................................. G06F 16/2455
USPC ......................................................... 707/769
See application file for complete search history.

(56) References Cited

U.S. PATENT DOCUMENTS 9,818,136 B1 * 11/2017 Hoffberg ............... G07F 17/323
10,754,886 B2 * 8/2020 Anderson .............. G06N 20/00
11,656,851 B2 * 5/2023 Clement ................ G06N 3/045
717/106
12,182,125 B1 * 12/2024 Buniatyan ................ G06N 3/08
12,211,598 B1 * 1/2025 Aravamudan ......... G16H 10/60
12,254,005 B1 * 3/2025 Sinha ..................... G16H 50/70
12,298,975 B2 * 5/2025 Baldua ................ G06F 16/2425
12,314,294 B1 * 5/2025 Browder ................. G06F 16/31
12,430,378 B1 * 9/2025 M ......................... G06F 40/284
12,475,178 B2 * 11/2025 Sahu ................... G06F 3/04895
2022/0264085 A1 * 8/2022 Galpin ................. H04N 19/593
2024/0256757 A1 * 8/2024 Manavoglu ........... G06F 40/134
2024/0354503 A1 * 10/2024 Baruch ................. G06F 16/345
2024/0362093 A1 * 10/2024 Zhou ..................... G06F 16/243
2024/0428783 A1 * 12/2024 Gupta ................... G06F 40/216
2025/0005057 A1 * 1/2025 Khosla ................ G06F 16/3344
2025/0013833 A1 * 1/2025 Mcnamara ............. G06F 40/40
2025/0054068 A1 * 2/2025 Arriaga .................. G06Q 40/08
2025/0111151 A1 * 4/2025 Huang .................. G06F 40/284
2025/0138408 A1 * 5/2025 Barber ................... G03B 43/00
2025/0156463 A1 * 5/2025 Rosa ................... G06F 16/3349
2025/0165711 A1 * 5/2025 Libbey .................. G06F 40/284
2025/0200086 A1 * 6/2025 Malboubi ............... G06F 40/40
(Continued)

*Primary Examiner* — Hanh B Thai
(74) *Attorney, Agent, or Firm* — Lowenstein Sandler LLP

(57) ABSTRACT

In various examples, systems and techniques are directed to network-based heteroassociative retrieval-augmented generation (HRAG) for efficient augmentation of inputs into artificial intelligence models. Example techniques include storing documents in a network-based store (NBS) having multiple stages of matrix multiplication(s) and non-linear activation(s). Storing documents includes modifying parameter(s) of matrix multiplications of at least one of the stages. The example techniques further include processing, using the NBS, a query to obtain retrieved document(s) associated with the query and at least approximately reproducing stored document(s). The example techniques further include processing, using a language model, a prompt that is based at least on the query and the retrieved document(s).

20 Claims, 15 Drawing Sheets

(56) References Cited

U.S. PATENT DOCUMENTS

| | | | | |
|---|---|---|---|---|
| 2025/0272581 | A1* | 8/2025 | Massie | G06N 5/022 |
| 2025/0279091 | A1* | 9/2025 | Bataev | G10L 15/16 |
| 2025/0292021 | A1* | 9/2025 | Raghavan | G06V 10/764 |
| 2025/0292022 | A1* | 9/2025 | Raghavan | G06V 10/82 |
| 2025/0292209 | A1* | 9/2025 | Angilly | G06F 40/10 |
| 2025/0299463 | A1* | 9/2025 | Shin | G06V 10/82 |
| 2025/0307702 | A1* | 10/2025 | Ghosh | G06N 3/045 |
| 2025/0310585 | A1* | 10/2025 | Rangan | G06V 30/10 |
| 2025/0321786 | A1* | 10/2025 | Ramalad | G06F 9/546 |
| 2025/0336401 | A1* | 10/2025 | Albasiri | G10L 15/26 |
| 2025/0363158 | A1* | 11/2025 | Brown | G06F 16/285 |
| 2025/0363345 | A1* | 11/2025 | Brown | G06F 16/285 |
| 2025/0371333 | A1* | 12/2025 | Kriman | G06N 3/08 |
| 2025/0378271 | A1* | 12/2025 | Mattenson | G06F 40/211 |

* cited by examiner

HETEROASSOCIATIVE RETRIEVAL-AUGMENTED STORES FOR AI PROCESSING

TECHNICAL FIELD

At least one embodiment pertains to facilitating efficient processing of data using artificial intelligence (AI) systems. For example, at least one embodiment pertains to augmentation of AI processing with content of documents and other data relevant for AI operations stored in an AI-accessible store.

BACKGROUND

Well-trained language models—such as large language models (LLMs)—are capable of supporting conversations in natural language, understanding speaker's intent and emotions, explaining complex topics, generating new texts upon receiving suitable prompts, providing advice regarding topics of interest to a user, processing image, audio, and/or other data types, and/or performing other functions. LLMs typically undergo self-supervised training on massive amounts of text data and/or other data types, depending on the embodiment, and learn to predict next and/or missing tokens (which may correspond to sub-words, symbols, words, etc.) in a phrase/sentence, detect intent and/or sentiment of a human speaker, determine if two sentences are related or unrelated, and/or perform other basic language tasks. Following the initial training, LLMs often undergo instructional (prompt-based) supervised fine-tuning that causes LLMs to acquire more in-depth language proficiency and/or master more specialized tasks. Supervised fine-tuning includes using learning prompts (questions, hints, etc.) that are accompanied by example texts (e.g., answers, sample essays, etc.) serving as training ground truth. In reinforcement fine-tuning, a human evaluator assigns grades indicative of a degree to which the generated text resembles human-produced texts.

DETAILED DESCRIPTION

Figure 1:
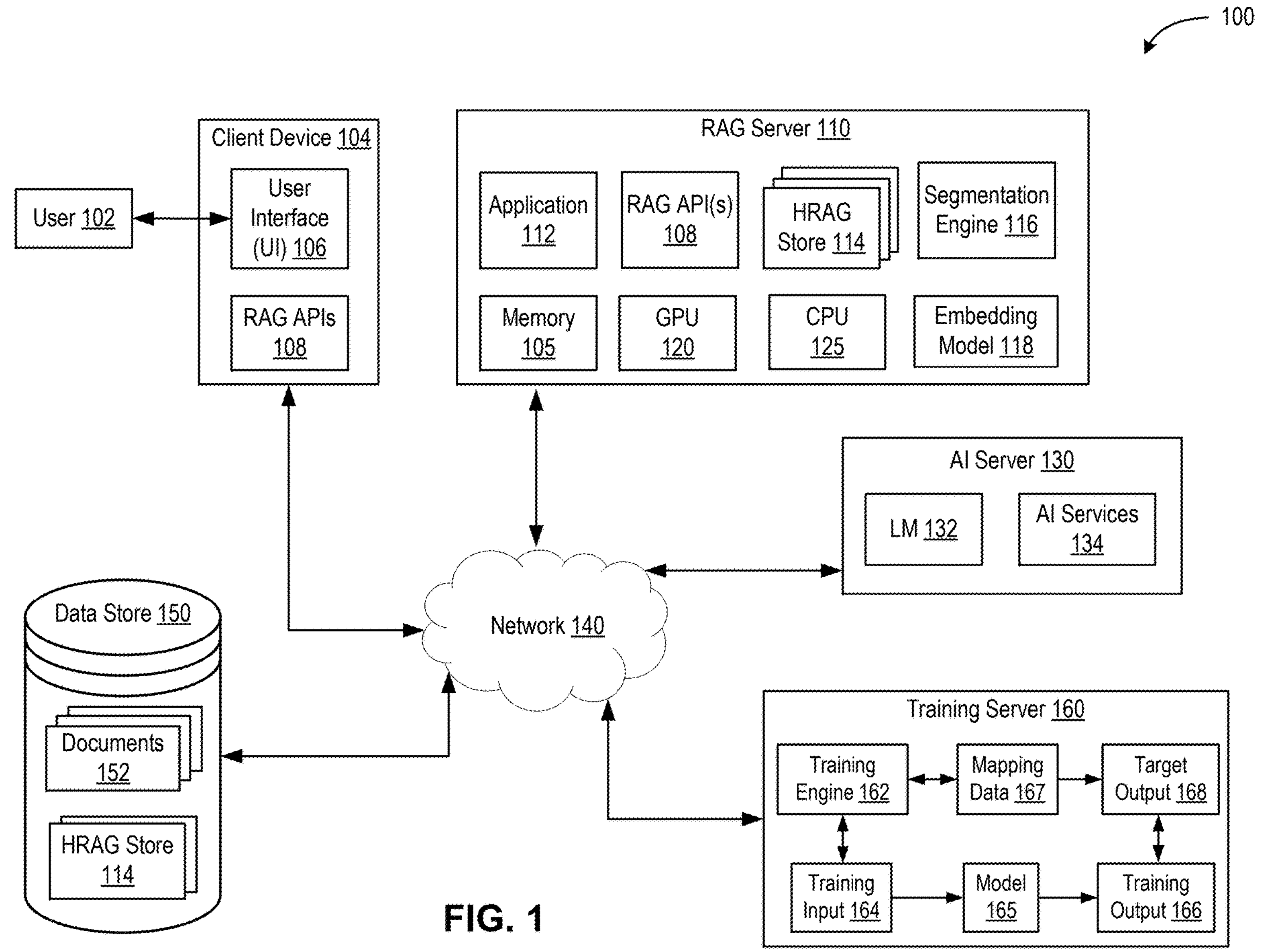
FIG. 1 is a block diagram of an example computing system capable of deploying a network-based heteroassociative retrieval-augmented generation (HRAG) store for efficient augmentation of inputs into AI models, according to at least one embodiment.

Training of language models (LMs), including large language models (LLM) and/or vision language models (VLMs), typically involves using large volumes of training data (e.g., human-created texts) that teach LMs to generate responses to user queries including questions, requests for information, advice, explanations of various general and specialized subjects, images, video, audio, digital assets, and/or the like. Since the number of topics that can be of interest to users is practically unlimited, LMs are regularly tasked with responding to queries about things and concepts that have not been extensively represented in the training data. Such queries can lead to suboptimal responses that can be incorrect and/or misleading.

Retrieval-augmented generation (RAG) is the technique that improves outputs of the LMs by augmenting LM inputs (queries) with additional information that may be of relevance to the inputs, e.g., information that includes context, data, specialized knowledge about the subject of the query, and so on. Such augmentation reduces the amount of LM hallucinations and is also widely used in applications where sensitive user data has to remain private and cannot be used in training of the LM, which is often operating in a public domain.

Such additional information can be stored in the form of embeddings—feature vectors or vectors in a special N-dimensional embedding space—that encode words, sub-words, characters, sentences, paragraphs of text, etc., and/or any other strings of texts (and can also include images and/or audio recordings), together with their contextual connections. A trained encoder (embedding model) can encode strings of text into embeddings, which can be considered as points in the embedding space. During training, the embedding model learns to associate similar strings of text with similar embeddings corresponding to points closely situated in the embedding space and further learns to associate dissimilar strings of text with points that are located farther apart in the embedding space. A contextual information relevant to a particular LM query can be presented in the form of such embeddings, which can be pre-generated, for faster retrieval, and stored in a suitable data store.

As part of an LM prompt generation, a received user query can similarly be converted into embeddings, each embedding encoding the user query or a portion of the user query. These query embeddings can then be compared to the embeddings stored in the data store. For example, similarity factors (e.g., scalar Euclidean products) of pairs of embeddings can be computed and a set of stored embeddings most closely related to the query embedding can be identified. A corresponding—to the identified embeddings—portions of the stored documents can then be combined with the user query, as part of the contextual information, to generate a prompt that is used as an input into the LM, causing the LM to produce a more relevant and accurate response.

The existing RAG techniques, however, while operating reasonably well for small databases, slow down significantly as the size of the database increases and multiple pairwise comparison operations come at a significant latency and processing costs. Reduction in processing times then requires a sophisticated indexation scheme, which can be specific to the user's field of operations, type of data, and or the like. Developing and maintaining a large RAG database that uses such indexation requires substantial efforts. Furthermore, in the instances where the memory space available to store the database is limited, exceeding the storage space results in a loss of at least some of the stored entries.

Aspects and embodiments of the present disclosure address these and other challenges of the existing RAG technology by providing for scalable network-type heteroassociative RAG (HRAG) stores that do not suffer from catastrophic loss of stored data. During a document storage phase, various RAG information, including texts, images, videos, audios, sensor data, and/or the like (referred to as "documents" for brevity herein) may be encoded or learned as elements of one or more matrices. These matrix elements are learned during a storage phase of HRAG operations. For example, when one or more new documents are added to a HRAG store, the matrix elements are updated to incorporate the new documents. During a retrieval phase, a (suitably embedded) user query may be used as an input into the HRAG store whose output is a previously stored document having the most relevance to the user query or an entity that is largely the same (or similar) to that stored document. More specifically, depending on a size of the dimensions of HRAG matrices, up to a certain threshold number of stored documents may be retrieved during the query generation stage without loss of information. When the number of stored documents N exceeds this threshold number, no catastrophic loss of any of the stored documents takes place. Instead, retrieval of the stored documents occurs with reduced accuracy, which gradually diminishes with increased N, substantially uniformly for various stored documents.

The architecture of the HRAG store may include multiple layers of matrix operations that may be visualized as neuron connections arranged into an encoder portion and a decoder portion. The encoder portion may include a layer of matrix operations and activations (also referred to as an encoder feature stage herein) that processes query features (e.g., representations of a user input) of a feature dimension $N_F$ and generates hidden encoded states of a reduced dimension $N_H$. The encoder portion may further include another layer of matrix operations and activations (also referred to as an encoder label stage herein) that transforms the hidden encoded states into label states of yet another dimension $N_L$.

In some embodiments, the label states may additionally undergo a filtering that replaces k largest components of the label label states with unity and sets the remaining components to zero. The decoder portion may include a layer of matrix operations/activations (also referred to as a decoder label stage herein) that transforms the filtered label states into hidden decoded states with dimension $N_H$ and another layer of matrix operations/activations (also referred to as a decoder feature stage) that transforms the hidden decoded states into retrieved features of dimension $N_F$. The retrieved features generated by the HRAG store may then be added to the user query to form a prompt that is used as an input into the LM.

The retrieved features represent—exactly or approximately, depending on the total number of stored features—documents stored during a storage phase. More specifically, documents are stored (encoded) in the matrix elements of the feature stage. This storage is facilitated by heteroassociation between features and a set of distinct preset labels whose number may be as large as $N_C = N_L!/(N_L-k)!k!$, which is referred to as the storage capacity herein. Such heteroassociations effectively serve as a network-embedded indexation mechanism of the stored features. The association between labels and hidden features is expressed via matrix elements of the label stage, some of which may be randomly sampled from a suitable distribution.

The advantages of the disclosed embodiments include (but are not limited to) efficient retrieval of stored documents over a processing time that does not change with the number of stored documents N and that is determined by the time of processing of an input query feature by the HRAG store. The disclosed HRAG stores have elastic capacity such that, when the number of stored documents increases beyond a threshold number determined by Ny, gradual decrease of retrieval accuracy occurs without a sudden loss of any of the stored documents. Furthermore, the disclosed techniques do not require any additional sophisticated indexing techniques as the storing occurs automatically as part of unsupervised learning and the retrieval of documents is facilitated by a single pass through the HRAG store with no need to retrieve any indexation data.

FIG. 1 is a block diagram of an example computing system 100 capable of deploying a network-based heteroassociative RAG (HRAG) store for efficient augmentation of inputs into AI models, according to at least one embodiment. As depicted in FIG. 1, computing system 100 may include a client device 104, a RAG server 110, an AI server 130, a data store 150, and a training server 160 connected via a network 140. Network 140 may be a public network (e.g., the Internet), a private network (e.g., a local area network (LAN), or wide area network (WAN)), a wireless network, a personal area network (PAN), a combination thereof, and/or another network type.

Client device 104 may include one or more computing devices accessible to a user 102 and facilitating efficient use, by user 102 (and/or other users), of one or more AI models supported by AI server 130. In one example non-limiting embodiment, AI models may include an LM 132 and may further include any suitable AI services 134 associated with various additional AI models whose functionality and performance may similarly be improved with the disclosed techniques, e.g., vision language models (VLMs), automatic speech recognition (ASR) models, computer vision (CV) models, text-to-speech (TTS) models, speech-to-text (STT) models, sign language models, anomaly detection models, action detection models, object detection models, and/or any other suitable generative or discriminative AI models. RAG server 110 may be accessed by client device 104, which may be (or include) one or more computing devices that are under control of user 102, e.g., a desktop computer, a laptop computer, a smartphone, a tablet computer, a server, a wearable device, a virtual/augmented/mixed reality headset or head-up display, a digital avatar or chatbot kiosk, an in-vehicle infotainment computing device, and/or any suitable computing device capable of performing the techniques described herein. User 102 may be a person (e.g., an individual user) or an organization (e.g., a collective user). Client device 104 may include a memory and one or more processors (not shown in FIG. 1 for conciseness) communicatively coupled to the memory to support local computations performed on client device 104.

In some embodiments, client device 104 may provide a user interface (UI) 106 to support receiving and displaying texts, images, videos, audios, sensing data, and/or any other suitable data and user queries (or other inputs of LM 132 and/or AI services 134) from user 102 and providing to user 102 responses to user queries (or any other outputs of LM 132 and/or AI services 134). UI 106 may include one or more devices of various modalities, e.g., a keyboard, a touchscreen, a touchpad, a writing pad, a graphical interface, a mouse, a stylus, and/or any other pointing device capable of selecting words/phrases that are displayed on a screen, and/or some other suitable device. In some embodiments, UI 106 may include an audio device, e.g., a combination of a microphone and a speaker, a video device, such as a digital camera to capture an image or a sequence of two or more images (video frames). In some embodiments, text, speech, and/or video input devices may be integrated together, e.g., as part of a smartphone, tablet computer, desktop computer, and/or the like.

Client device 104 may facilitate access of user 102 to RAG server 110 that may deploy one or more HRAG stores 114. In some embodiments, RAG server 110 may be implemented on cloud. In some embodiments, RAG server 110 may perform one or more additional functions, e.g., generation of data, authentication of data, communication of data, and/or any other services that may be provided to user 102. Processing and storage of data on RAG server 110 may be protected using any suitable cryptographic protection techniques, including but not limited to symmetric and asymmetric key cryptography, digital authentication, and/or the like.

RAG server 110 may deploy one or multiple computing devices that may include a memory 105 (e.g., one or more memory devices or units) communicatively coupled to one or more processing devices, such as one or more graphics processing units (GPU) 120, one or more central processing units (CPU) 125, one or more data processing units (DPU), one or more parallel processing units (PPUs), and/or other processing devices (e.g., field-programmable gate arrays (FPGAs), application-specific integrated circuits (ASICs), and/or the like). Memory 105 may include a read-only memory (ROM), a flash memory, a dynamic random-access memory (DRAM), such as synchronous DRAM (SDRAM), a static memory, such as static random-access memory (SRAM), and/or some other memory capable of storing digital data. RAG server 110 may support execution of an application 112, which may be a text processing application, a video processing application, an audio processing application, a gaming application, an image or video rendering application, a computational application, a data processing application, a browsing application, a public or private security application, a manufacturing control operation, and/or any other suitable application. In some embodiments, application 112 may be provided to user 102 remotely, e.g., by any remote-access server, via UI 106 of client device 104.

RAG server 110 may be used to support and augment operations of AI server 130. In some embodiments, RAG server 110 may be operated as part of AI server 130 (e.g., under control of the same entity). In some embodiments, RAG server 110 may be operated under control of client device 104 and/or under control of a server that also controls (e.g., supports, authenticates, and/or the like) client device 104. In some embodiments, RAG server 110 may be operated independently of AI server 130 but may support inference operations of clients (such as user 102) using AI server 130.

In some embodiments, AI server 130 may deploy LM 132, which may be a large language model, e.g., a model with at least 100K of learnable parameters, a vision language model (VLM), and/or another language model. LM 132 may be trained by training server 160. In some embodiments, LM 132 may be trained in multiple stages. Initially, training server 160 may train LM 132 to capture syntax and semantics of human language, e.g., by training to predict a next, a previous, and/or a missing word in a sequence of words (e.g., one or more sentences of a human speech or text). LM 132 may also be trained using training data containing a large number of texts, such as human dialogues, newspaper texts, magazine texts, book texts, web-based texts, and/or any other texts. Since ground truth for such training is often present in the texts themselves, training server 160 may use such texts for self-supervised training of LM 132. This teaches LM 132 how to carry out a conversation with a user (a human user or another computer) in a natural language in a manner that closely resembles a dialogue with a human speaker, including understanding the user's intent and responding in ways that the user expects from a conversational partner. Following the initial self-supervised training, training server 160 may implement a supervised fine-tuning of LM 132 to teach LM 132 more specialized language skills, including expertise in a particular field of knowledge.

LM 132 may be implemented using neural networks with a large number (e.g., billions) of artificial neurons. In at least one embodiment, LM 132 may be implemented as a deep learning neural network having multiple levels of linear and non-linear operations. For example, LM 132 may include convolutional neural networks, recurrent neural networks (RNNs), fully-connected neural networks, long short-term memory (LSTM) neural networks, neural networks with attention, e.g., transformer neural networks, a combination of a convolutional network and one or more transformers (a conformer), and/or neural networks of other types. In at least one embodiment, LM 132 may include multiple neurons, with an individual neuron receiving its input from other neurons and/or from an external source and producing an output by applying an activation function to the sum of weighted (using trainable weights) inputs and, possibly, a bias value. In at least one embodiment, LM 132 may include multiple neurons arranged in layers, including an input layer, one or more hidden layers, and/or an output layer. Neurons from adjacent layers may be connected by weighted edges.

In some embodiments, in addition to LM 132, AI server 130 may support any additional AI services 134 that may benefit from deployment of one or more HRAG stores 114. AI services 134 may include (but need not be limited to) VLMs, multi-modal LMs, text-to-speech models, text-to-animation models, emotion detection models, emotion generation models, gesture generation models, facial expression generative models, speech-to-lip motion models, sign language models, models associated with robotics perception, control, safety, and/or navigation, models associated with autonomous or semi-autonomous machines, models for generating synthetic data, models for evaluating cellular signals.

In some embodiments, AI services 134 may be implemented using NVIDIA® Microservices, such as NVIDIA® Inference Microservices (NIMs), that operate system-level virtualization containers that may include one or more models optimized for high-performance inference, inference runtime software to execute the models (e.g., to provide outputs, predictions, responses, suggestions, etc., to a user), and/or various enterprise management software. A NIM container may host inferencing microservices for pretrained and customized AI models that can be deployed on many different platforms, including clouds, data centers, workstations, and/or the like. The NIM container(s) can accelerate operations of AI services 134 based on available hardware, including one or more GPUs, CPUs, and other processing devices. Deployed and operating inside a single container, AI services 134 may be accessible to a user via a suitable application programming interface (API) or multiple APIs that facilitates convenient integration of various AI applications, development frameworks, execution backends, and workflows. In some embodiments, APIs may be tailored to specific domains, e.g., text processing, speech processing, image/video processing, 3D processing, biology domain processing, medical domain processing, and/or the like. NIMs may provide to user 102 a set of available pre-optimized inference engines, including but not limited to NVIDIA® TensorRT™ and TensorRT-LLM. In some instances, NIMs may allow user 102 to select a type of a model execution (in both training and/or inference processing), e.g., a single- or multi-GPU execution, a single- or multi-node execution, and/or the like. NIM microservices may be capable of automatic optimization of model execution, including reducing response latency and increasing throughput of various deployed combinations of trained models and available system hardware, which may be detected at runtime. NIMs may also provide monitoring of execution of AI services 134 including performing health checks, enforcing security and privacy (including identity checks), collecting and displaying various execution metrics, and/or the like. NIMs may be implemented on Kubernetes or a similar container execution framework that runs on GPUs and/or other processing units (including DPUs, PPUs, and/or the like).

In some embodiments, RAG server 110 may deploy one or more RAG APIs 108 that provide, to user 102, a set of commands that can be understood by a non-expert user and may implement any, some, or all operations of the document storage phase and/or query processing (document retrieval) phase for augmentation of AI processing. The commands made available via RAG API(s) 108 may include selecting an HRAG store 114 associated with a particular information or knowledge domain, e.g., medical domain, manufacturing domain, information technology domain, security domain, human resources domain, and/or any other suitable domain or field. In some embodiments, RAG server 110 may operate a segmentation engine 116 that segments input texts and/or any other input documents into segments of a predetermined size and may further operate an embedding model 118 that converts the document segments into feature vectors (embeddings).

As used herein, a “document,” should be understood as any digital data including any text or portion of a text, image, table, plot, data set, one or more frames of a video file, an audio, a set of sensor data, and/or any other data, including multimodal data, such as combination of texts and images, texts and audio, and/or the like.

In some embodiments, an API package with RAG API(s) 108 may be downloaded from RAG server 110 to client device 104 and used to install RAG API(s) 108 thereon to enable user 102 to deploy augmented AI processing via client device 104. For example, user 102 may identify a document stored on client device 104 or elsewhere (e.g., in data store 150) and select various modules and components for processing of the identified documents, e.g., a specific HRAG store 114, segmentation engine 116, embedding model 118, and/or the like. Responsive to receiving the document selection, RAG API(s) 108 may execute one or more preprogrammed calls to upload the identified document to RAG server 110 for processing using the selected segmentation engine 116 and/or embedding model 118. Processed (e.g., segmented and embedded) documents may be stored in the selected HRAG store 114 (e.g., as disclosed in more detail below in conjunction with FIG. 4). Similarly, a user query submitted by user 102, e.g., via UI 106 of client device 104, may be forwarded to RAG server 110 for processing. More specifically, RAG server 110 may apply embedding model 118 to the user query to generate one or more query features and may process the query features by a suitable (e.g., associated with a particular domain relevant for the user query) HRAG store 114, which retrieves documents previously stored (e.g., as disclosed in more detail below in conjunction with FIG. 3) in the HRAG store 114 and that are most similar to the query. A prompt generator may then augment the user query with retrieved features representing stored documents or segments of stored documents.

In some embodiments, any, some, or all operations of RAG server 110 may be implemented in a container. More specifically, various codes implementing any, some, or all of RAG API(s) 108, HRAG store 114, segmentation engine 116, embedding model 118, and/or other suitable software modules may be packaged into an image container, e.g., a lightweight executable software package. The image container may further include various system tools, libraries, and settings. A container execution engine (e.g., Docker engine, a Kubernetes engine, and/or any similar container execution engine) may receive the container image and instantiate a RAG container from the container image in a secure isolated environment. In some embodiments, the image container may be received and executed on client device 104.

Data store 150 may store documents 152 that are to be encoded as parameters of one of HRAG stores 114, e.g., during document storing phase by the respective HRAG store 114, as may be performed by training server 160. Data store 150 may further include learned HRAG store(s) 114, e.g., HRAG store(s) with at least some documents stored thereon. Data store 150 may be accessible to client device 104, RAG server 110, training server 160, and/or other computing devices not explicitly shown in FIG. 1, via network 140 or via a suitable bus, interconnect, and/or the like. Data store 150 may include persistent storage and may be hosted by one or more storage devices, such as main memory, magnetic or optical storage disks, tapes, or hard drives, network-attached storage (NAS), storage area network (SAN), and so forth. Although depicted as separate from RAG server 110, AI server 130, and/or client device 104, in at least some embodiments, data store 150 may be a part of RAG server 110, AI server 130, training server 160, and/or client device 104. In at least some embodiments, data store 150 may be a network-attached file server, while in other embodiments, data store 150 may be some other type of persistent storage, such as an object-oriented database, a relational database, and so forth, that may be hosted by RAG server 110, client device 104, or one or more other machines coupled to RAG server 110, AI server 130, training server 160, and/or client device 104.

Training server 160 hosting training engine 162 may be (or include) a desktop computer, a laptop computer, a smartphone, a tablet computer, a server, and/or any suitable computing device capable of performing the techniques described herein. Training engine 162 may train or otherwise update LM 132, AI services 134, and/or any models that may be deployed as part of or in conjunction with computing system 100. Training of LM 132 may be performed using training data that includes content (e.g., texts, computer codes, images, videos, audios, and/or other pertinent data) annotated with ground truth, which may include texts or other data created by humans or other trained models. Training of LM 132 may also include zero-shot training, e.g., with LM 132 given training prompts with examples of tasks to be performed. Training of HRAG stores 114 may be performed using documents 152.

During training, the predictions of a particular model 165 being trained may be compared with ground truth, e.g., target outputs 168. More specifically, training engine 162 may cause model 165 to process training inputs 164, which may include task queries/prompts, and generate training outputs 166, e.g., example responses corresponding to training inputs 164. During training, training engine 162 may also generate mapping data 167 (e.g., metadata) that associates training inputs 164 with correct target outputs 168. Target outputs 168 may include responses prepared by human-expert for the corresponding task prompts. Training causes model 165 to learn how to generate desired target outputs 168 based on various training inputs 164.

Initially, edge parameters (e.g., weights and biases) of model 165 may be assigned some starting (e.g., random) values. For every training input 164, training engine 162 may compare training output 166 with the target output 168. The resulting error or mismatch, e.g., the difference between the desired target output 168 and the generated training output 166 of model 165, may be back-propagated through model 165 and at least some parameters of model 165 may be changed in a way that brings training output 166 closer to target output 168. Such adjustments may be repeated until the output error for a given training input 164 satisfies a predetermined condition (e.g., falls below a predetermined error). Subsequently, a different training input 164 may be selected, a new training output 166 generated, and a new series of adjustments implemented, until the model is trained to a target degree of accuracy or until the model reaches the limit of its (architecture-determined) accuracy.

Figure 2:
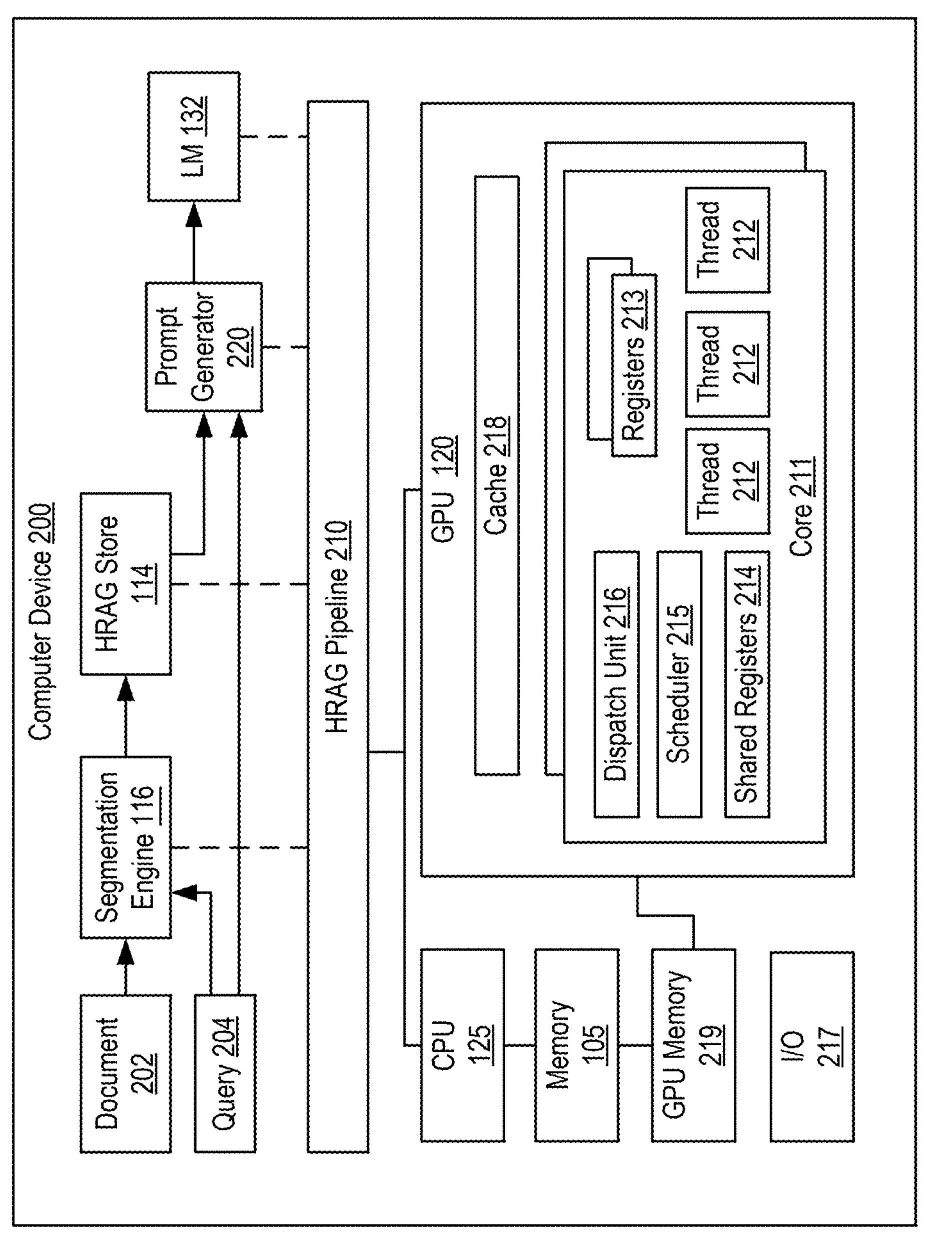
FIG. 2 illustrates an example computing device that supports operations of an HRAG store, according to at least one embodiment.

FIG. 2 illustrates an example computer device 200 that supports operations of an HRAG store, according to at least one embodiment. In at least one embodiment, computer device 200 may be a part of RAG server 110, AI server 130, and/or client device 104 (with reference to FIG. 1). In at least one embodiment, an HRAG pipeline 210 may be operated by computer device 200, e.g., supported by one or more RAG APIs 108 (with reference to FIG. 1). HRAG pipeline 210 may facilitate processing of various inputs, e.g., one or more documents 202, one or more queries 204, and/or the like. For example, during a document storage phase, a document 202 may be segmented, e.g., by segmentation engine 116, into portions of a suitable size and stored in parameters (matrix elements or weights) of HRAG store 114. A subsequent query 204 into LM 132, e.g., as received from a user, may be processed by the learned HRAG store 114 to retrieve one or more previously stored documents 202, e.g., in the form of suitable embeddings that exactly or approximately represent the stored documents. A prompt generator 220 may then combine query 204 together with retrieved documents into a prompt that is used as an input into LM 132. The output of LM 132 may be presented to the user, e.g., on any suitable user interface.

Operations and calls of HRAG pipeline 210 and various modules operating in conjunction with HRAG pipeline 210, and/or other software/firmware instantiated on computer device 200 may be executed using one or more GPUs 120, one or more CPUs 125, one or more parallel processing units (PPUs) or accelerators, such as a deep learning accelerator, data processing units (DPUs), and/or the like. In at least one embodiment, a GPU 120 includes multiple cores 211. An individual core 211 may be capable of executing multiple threads 212. Individual cores 211 may run multiple threads 212 concurrently (e.g., in parallel). In at least one embodiment, any, some, or all threads 212 may have access to registers 213. Any, some, or all registers 213 may be thread-specific registers with access to a register restricted to a respective thread. Additionally, any, some, or all shared registers 214 may be accessed by one or more (e.g., all) threads of a core 211. In at least one embodiment, individual cores 211 may include a scheduler 215 to distribute computational tasks and processes among different threads 212 of the core. A dispatch unit 216 may implement scheduled tasks on appropriate threads using correct private registers 213 and shared registers 214. Computer device 200 may include input/output component(s) 217 to facilitate exchange of information with one or more users or developers.

In at least one embodiment, GPU 120 may have a (high-speed) cache 218, access to which may be shared by any, some, or all cores 211. Furthermore, computer device 200 may include a GPU memory 219 where GPU 120 may store intermediate and/or final results (outputs) of various computations performed by GPU 120. After completion of a particular task, GPU 120 (or CPU 125) may move the output to (main) memory 105. In at least one embodiment, CPU 125 may execute processes that involve serial computational tasks whereas GPU 120 may execute tasks (such as matrix multiplications, e.g., as performed by artificial neurons) that are amenable to parallel processing.

Figure 3:
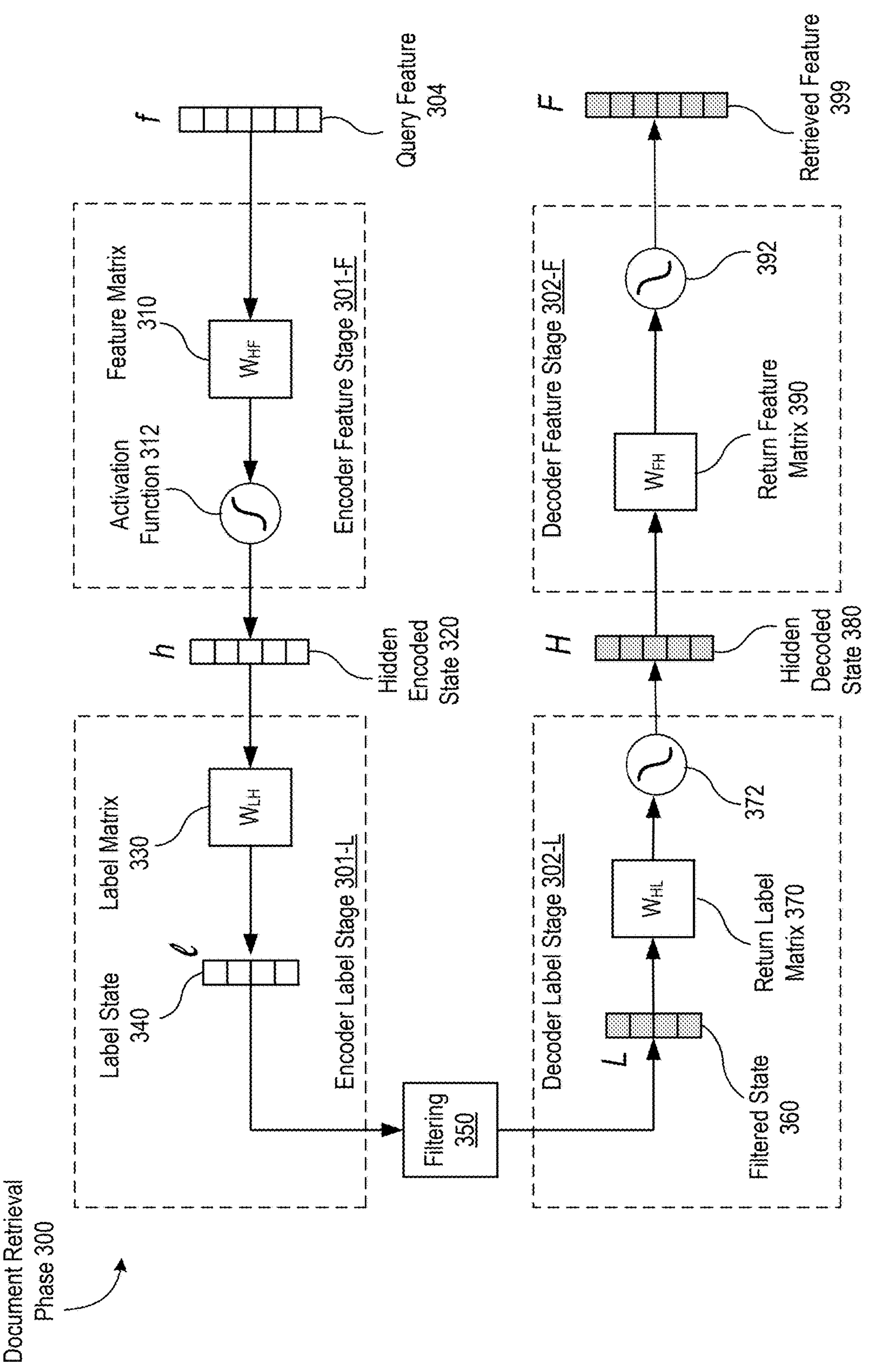
FIG. 3 illustrates an example data flow of a document retrieval phase of deploying a HRAG store for efficient augmentation of inputs into AI models, according to at least one embodiment.

FIG. 3 illustrates an example data flow of a document retrieval phase 300 of deploying a HRAG store for efficient augmentation of inputs into AI models, according to at least one embodiment. Operations illustrated in FIG. 3 may be performed by client device 104, RAG server 110, and/or other suitable computing device. In some embodiments, operations of document retrieval phase 300 illustrated in FIG. 3 may be performed to facilitate generation of efficient queries to an LM or to augment inputs into other AI models. For example, similar operations may be performed to retrieve images that are based on user's instructions—e.g., descriptions of images—with one or more previously stored images to be identified and used to augment the user's instructions. Additionally, the disclosed embodiments may be applied to storage/retrieval of audios, videos, datasets, and/or any other entities that can be represented via strings of numbers.

Document retrieval phase 300 may include obtaining a query feature 304 associated with a received (e.g., via a RAG API 108, with reference to FIG. 1 and FIG. 2) user query, which may include a text query, an audio query, an image query, and/or the like. In some embodiments, a user query may be query (e.g., a large query) that may first be segmented into smaller portions of a predetermined size S. In some embodiments, segmented portions may have a certain overlap O.

The received user query (or a portion of the user query appropriately segmented, if dictated so by the size of the query) may be converted into one or more query features 304 by a suitable embedding model (e.g., embedding model 118 in FIG. 1). Query feature 304 may have a suitable predetermined dimension, e.g., $N_F$, e.g., 512 bits, 1024 bits, 2048 bits, etc.

The HRAG store may include an encoder portion and a decoder portion, each portion having multiple layers of linear matrix multiplications and non-linear activations. For example, the encoder portion may include an encoder feature stage 301-F and an encoder label stage 301-L, and the decoder portion may include a decoder label stage 302-L and a decoder feature stage 302-F.

In some embodiments, encoder feature stage 301-F may process query feature f 304 using a feature matrix $W_{HF}$ 310, which may be an $N_H \times N_F$ matrix, where $N_H$ may be a hidden state dimension. In some embodiments, the hidden state dimension $N_H$ may be lower than the feature dimension, $N_H < N_F$. The output of the matrix multiplication $W_{HF} \cdot f$ may be processed by a suitable activation function 312 to generate a hidden encoded state 320, $$h = \text{Activation}(W_{HF} \cdot f).$$

In some embodiments, activation function 312 may be a sign function, Activation(x)=sign(x)≡x/|x|. In some embodiments, activation function 312 may be a step function, e.g., Activation(x)=1, if x>0, and zero otherwise. In some embodiments, activation function 312 may be a ReLu function, a sigmoid function, a hyperbolic tangent function, or some other activation function.

Hidden encoded state 320 may be processed by encoder label stage 301-L that includes a label matrix $W_{LH}$ 330, which may be an $N_L \times N_H$ matrix, where $N_L$ is a label dimension. In some embodiments, the label dimension N may be lower than the hidden state dimension, $N_L < N_H$. Matrix multiplication $l = W_{LH} \cdot h$ may generate a label state l 340. Label state 340 may undergo filtering 350 that reduces a number of non-zero components of label state 340 and generates a filtered state 360, $$L = \text{Filter}(l).$$

In some embodiments, function Filter(•) implemented by filtering 350 may retain k maximum-valued components of $N_L$ total components of the label state 340 while replacing the remaining $N_L - k$ components with zeros. In some embodiments, filtering 350 may further set the values of the retained k components of the label state 340 to some predetermined value, e.g., 1 or the like.

The decoder portion may transform the filtered state 360 into a retrieved feature 399. More specifically, decoder label stage 302-L may process filtered state L 360 using a return label matrix $W_{HL}$ 370, which may be an $N_H \times N_L$ matrix. The output of the matrix multiplication $W_{HL} \cdot L$ may be processed by an activation function 372 to generate a hidden decoded state 380, $$H = \text{Activation}(W_{HL} \cdot L).$$

In some embodiments, activation function 372 may be the same as activation function 312. In some embodiments, activation function 372 may be different from activation function 312.

Hidden decoded state 380 may be processed by decoder feature stage 302-F that includes a return feature matrix $W_{FH}$ 390, which may be an $N_F \times N_H$ matrix. The output of the matrix multiplication $W_{FH} \cdot H$ may be processed by an activation function 392 to generate a retrieved feature 399, $$F = \text{Activation}(W_{FH} \cdot H).$$

In some embodiments, activation function 392 may be the same as activation function 312 and/or activation function 372. In some embodiments, activation function 392 may be different from activation function 312 and/or activation function 372.

Operations of document retrieval phase 300 extract a retrieved feature 399 that has the most similarity to query feature 304. Provided that the total number N of document features stored via the weights (elements) of feature matrix $W_{FH}$ 310 (and return feature matrix $W_{FH}$ 390), e.g., as disclosed in conjunction with FIG. 4, not exceeding a threshold number $N_H$ (capacity) of the HRAG store, the retrieved feature 399 reproduces the corresponding stored document feature exactly. In the instances of the total number of stored document features exceeding the HRAG capacity, $N > N_H$, the retrieved feature 399 approximately reproduces the stored document having the maximum similarity to query feature 304, the approximate resemblance decreasing with increasing the ratio $N_H/N$.

One or more retrieved features 399 associated with the user query and generated by the HRAG store may be added to the user query to form a prompt that is used as an input into the LM, e.g., as disclosed in conjunction with FIG. 2.

Figure 4:
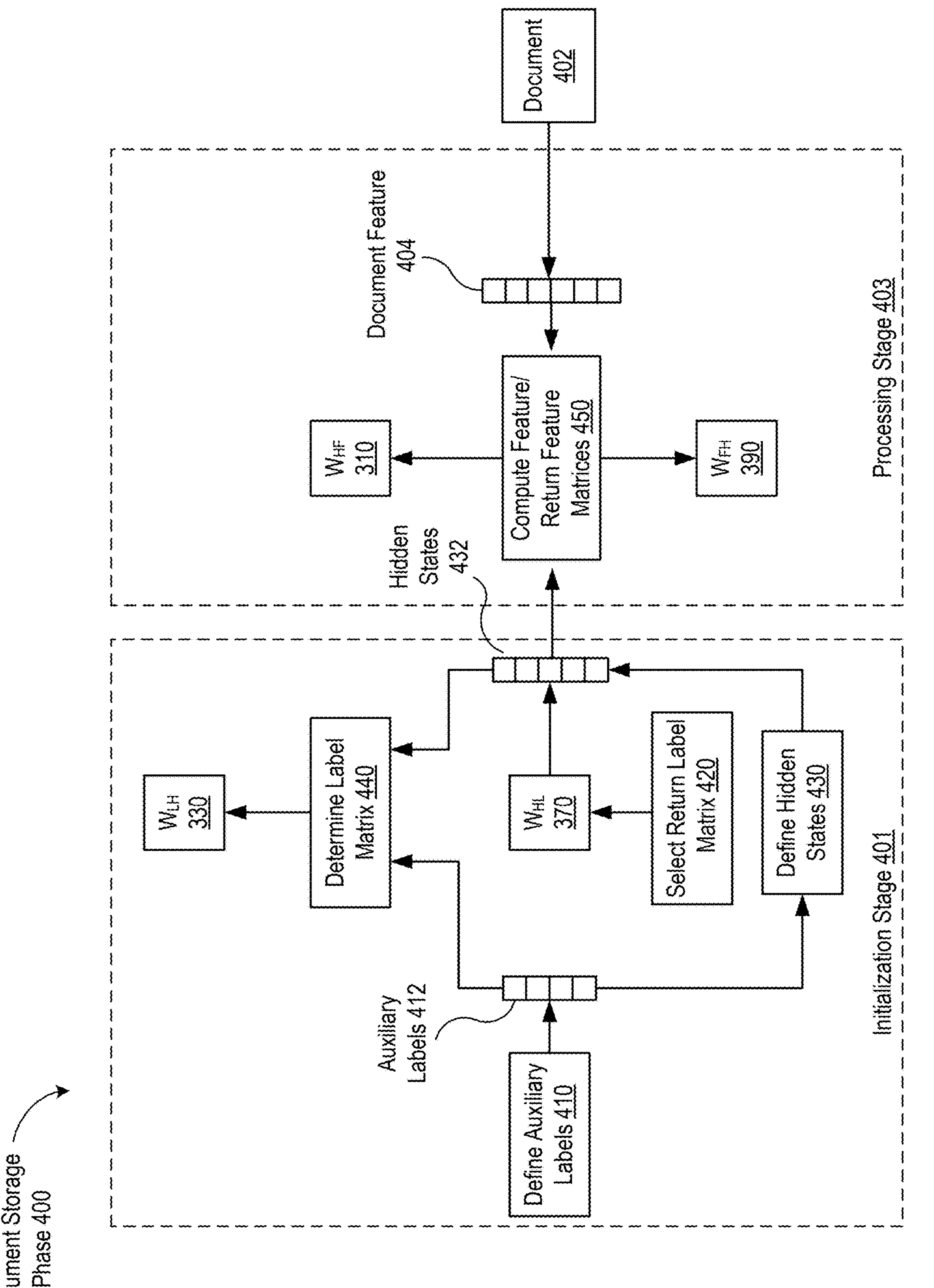
FIG. 4 illustrates an example data flow of a document storage phase of storing documents in a HRAG store for efficient augmentation of inputs into AI models, according to at least one embodiment.

FIG. 4 illustrates an example data flow of a document storage phase 400 of storing documents in a HRAG store for efficient augmentation of inputs into AI models, according to at least one embodiment. Operations illustrated in FIG. 4 may be performed by the same computing device that performed operations of a document retrieval phase 300 illustrated in FIG. 3 or by a different computing device. Operations illustrated in FIG. 4 may be performed to process, embed, and store any suitable document 402, including a text document, an image, an audio file, a video file, a data file, and/or the like. (Although, for brevity and conciseness, a single document 402 is referenced throughout the description of FIG. 4, any batch of multiple documents 402 may be processed similarly, e.g., sequentially or in parallel.) In some embodiments, document 402 may be associated with any general or specific area of knowledge, e.g., medical diagnostics, computing technology, mathematics, computer games, art history, computer technology, and/or the like. Document 402 may be provided in any suitable manner, including uploading by a user (e.g., user 102 in FIG. 1) or under control of the user, automatic data collection, database mining, and/or the like. In some instances, e.g., when document 402 is available as an image, document 402 may first undergo optical character recognition (OCR). Prior to (or as part of) the OCR, document 402 may be denoised, filtered, sharpened, or enhanced using any appropriate pre-processing tools or techniques.

Processing of document 402 may include segmentation (e.g., by segmentation engine 116, as shown in FIG. 2) into portions (segments) of a predetermined size S. For example, in the instances of a text document 402, size S may be specified as a number of characters, words, sentences, lines, paragraphs, pages, and/or the like, e.g., 1000 characters, 200 words, one page, and so on. Segmentation settings may further include an amount of segment overlap O between adjacent segments. The overlap O may also be specified via a number of words, sentences, and so on (e.g., 20 words, 100 characters, and/or the like), percents (e.g., 10%, 20%, and/or the like).

Document 402 (or a segment of document 402) may be represented as a document feature 404 (feature vector, embedding, etc.) which may be any digital representation of document 402 of a suitable dimension (a number of components of an individual vector), generated by a suitable embedding model (e.g., embedding model 118 in FIG. 2) that represents ("embeds") documents as points (vectors) in the embedding space. Components of document feature 404 may have integer values or floating-point values.

Document storage phase 400 may include an initialization stage 401, which configures the portion of the HRAG that does not depend on specific documents, and a processing stage 403, which modifies the portion of the HRAG in view of stored documents 402. For example, initialization stage 401 may determine elements (weights) of label matrix 330 (and return label matrix 370) and processing stage 403 may determine elements (weights) of feature matrix 310 (and return feature matrix 390).

In some embodiments, initialization stage 401 may include an operation 410 of defining a set of auxiliary labels 412 that serve as anchors during subsequent storage of documents by effectively replacing a document indexation mechanism. In some embodiments, auxiliary labels 412 may be a set of k-hot Ny-dimensional vectors, in which k bits have value 1 and the remaining $N_L$−k bits have value 0 (or vice versa). In such embodiments, there may be up to the total of $N_C=N_L!/(N_L-k)!k!$ different auxiliary labels (storage capacity). For example, in the instance of 2-hot (k=2) auxiliary labels of dimension $N_L$=5, there are $N_C$=10 different auxiliary labels 412 represented by columns of the following matrix:

$$\begin{bmatrix} 1 & 1 & 1 & 1 & 0 & 0 & 0 & 0 & 0 & 0 \\ 1 & 0 & 0 & 0 & 1 & 1 & 1 & 0 & 0 & 0 \\ 0 & 1 & 0 & 0 & 1 & 0 & 0 & 1 & 1 & 0 \\ 0 & 0 & 1 & 0 & 0 & 1 & 0 & 1 & 0 & 1 \\ 0 & 0 & 0 & 1 & 0 & 0 & 1 & 0 & 1 & 1 \end{bmatrix}$$

Although in this example, relatively small values of k and $N_L$ are illustrated, in actual applications these values may be significantly larger and need not be limited other than by considerations of an expected number of stored documents. For example, a larger expected number of documents (or documents segments) may favor choosing larger values of $N_L$ (e.g., to enable larger number of labels for storage of a larger number of documents) whereas a smaller expected number of documents (segments) may favor choosing smaller values of $N_L$ (e.g., to reduce computational costs associated with the large label state matrices). Similarly, a larger expected number of stored documents may favor choosing larger values of the hidden layer size $N_H$ (e.g., to minimize the amount of information lost when the number of documents exceeds $N_H$)

Operation 420 may include selecting elements (weights) of the return label matrix 370. In some embodiments, elements of return label matrix 370 may be randomly sampled from a suitable distribution, e.g., a normal distribution N(0,1) with zero mean and a unit variance. In some embodiments, label weights may be sampled from a different distribution, e.g., a uniform distribution, Poisson's distribution, and/or some other distribution.

Sampled elements of return label matrix 370 may be used in operation 430 that defines a set of hidden states 432. For example, hidden state $h_\mu$ with $\mu\in[1, N_C]$ may be defined using a respective auxiliary label $l_\mu$ according to $$h_\mu = \text{Activation}(W_{HL} \cdot l_\mu),$$

where activation function Activation(x) may be the same as activation function 372 (with reference to FIG. 3), e.g., a sign function, in some embodiments.

At operation 440, auxiliary labels 412 and hidden states 432 may be used to determine elements of label matrix 330. In one example embodiment, label matrix $W_{LH}$ may be defined as the sum over outer products of auxiliary labels and transposed hidden states corresponding to these auxiliary labels, $$W_{LH} = \frac{1}{N_T}\sum_{\mu=1}^{N_C} l_\mu \otimes (h_\mu)^T.$$

In some embodiments, elements of label matrix 330 may be computed (and stored) directly using this formula. In some embodiments, elements of label matrix 330 may be determined using Hebbian learning between the set of auxiliary labels $l_\mu$ 412 and the set of hidden states $h_\mu$ 432.

Operation 450 may use hidden states 432 to store one or more documents 402. In one example embodiment, to compute feature matrix 310 and return feature matrix 390, a computing device performing processing stage 403 may form a matrix $\hat{H}$ with dimensions $N_H \times N_C$ whose columns are hidden states $h_\mu$ 432. Processing stage 403 may further form a matrix $\hat{F}$ with dimensions $N_F \times N$ where N is the number of document features 402 being stored in HRAG, with columns of F being different document features 402, and the number N being less or equal to the storage capacity, $N \le N_C$. The heteroassociative weights of feature matrix 310 and return feature matrix 390 may then be determined using pseudoinverse learning, in some embodiments. More specifically, feature matrix 310 may be computed as the matrix product, $$W_{HF} = \hat{H} \cdot \hat{F}^+,$$

where $\hat{F}^+$ is the pseudoinverse of the matrix $\hat{F}$. Similarly return feature matrix 390 may be computed as the matrix product $$W_{FH} = \hat{F} \cdot \hat{H}^+,$$

where $\hat{H}^+$ is the pseudoinverse matrix to the matrix A. When one or more new documents 402 are being added to the HRAG, the corresponding document feature(s) 402 are used to update matrices $\hat{F}$ and $\hat{F}^+$, e.g., using pseudoinverse learning (or, in some embodiments, a direct computation), and further to update feature matrix 310 and return feature matrix 390. The label matrix 330 and the return label matrix 370 do not have to be updated when new documents are stored. In some embodiments, as additional document features 402 are being added to the HRAG, elements of $W_{HF}$ and $W_{FH}$ are updated using live pseudoinverse learning.

Other variations of the document storage phase 400 are within the scope of this disclosure. For example, the feature matrix 310 and the return feature matrix 390 may be computed using transpose matrices $\hat{F}_T$ and $\hat{H}^T$:$W_{HF}=\hat{H}\cdot\hat{F}^T$ and $W_{FH}=\hat{F}\cdot\hat{H}^T$.

In another embodiment, k-hot labels may be replaced with a set of disjointed groups of cells, with each group of grid cells including cyclic (modular) translations of e.g., 1-hot vectors of different lengths. For example, one group of cells may be a group of 1-hot vectors of four bits each (e.g., 1000, 0100, 0010, 0001), group of 1-hot vectors of five bits (e.g., 10000, 01000, 00100, 00010, 00001), and so on.

Figure 5:
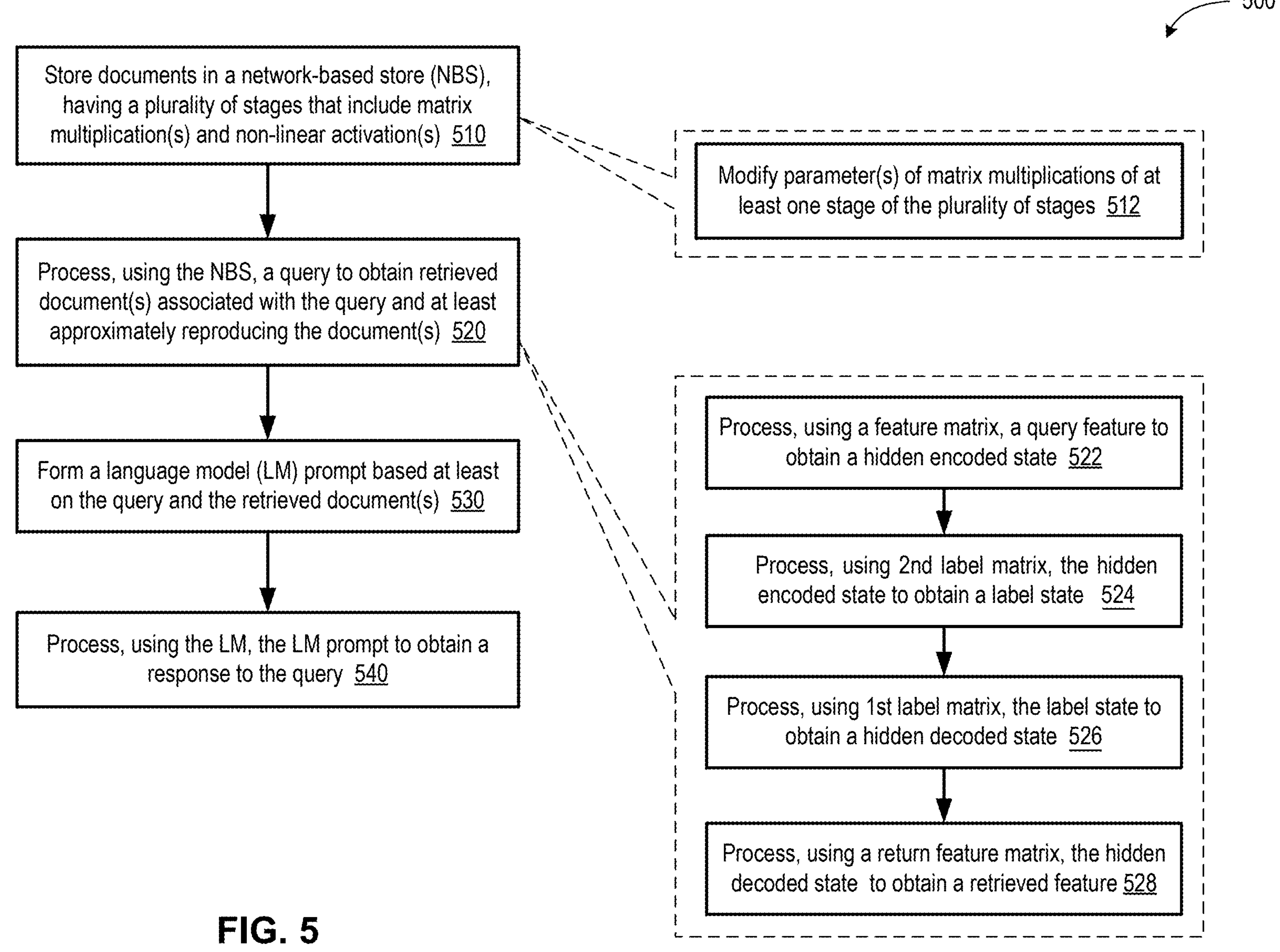
FIG. 5 is a flow diagram of an example method of deploying a HRAG store for efficient augmentation of inputs into AI models, according to at least one embodiment.
Figure 6:
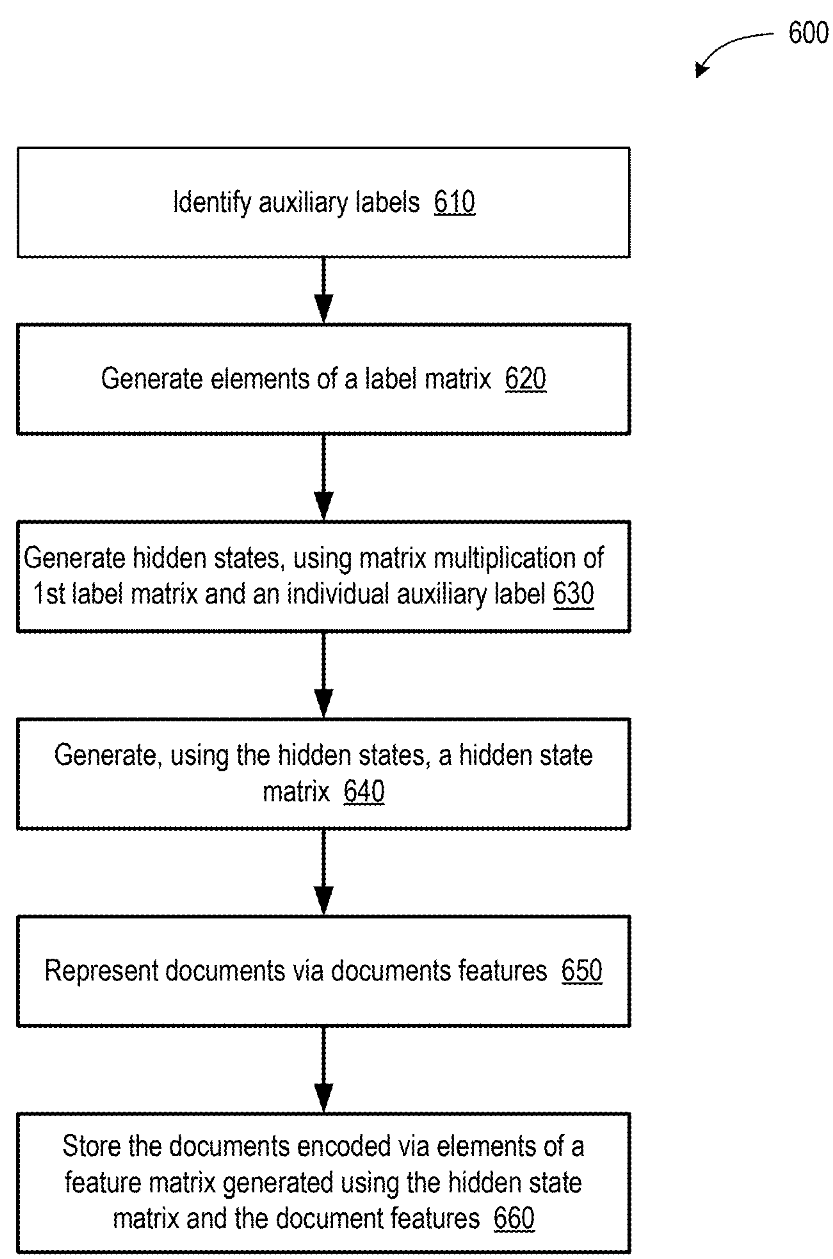
FIG. 6 is a flow diagram of an example method of storing documents in an HRAG store for efficient augmentation of inputs into AI models, according to at least one embodiment.

FIGS. 5 and 6 illustrate example methods 500 and 600 directed to the use of network-based HRAG stores for efficient augmentation of inputs into AI models. Methods 500 and 600 may be used in the context of deployment and/or use of AI, including (but not limited) deployment and/or use of language models (LMs), vision language models (VLM), computer vision models, text-to-speech models, speech-to-text models, and/or other AI models where processing of an input into an AI model (e.g., text, image, speech, audio, video, digital assets, CAD, and/or any other data) may be improved by augmenting the input with an appropriate contextual information (e.g., instances of historical data, background data, example outputs, and/or the like). In at least one embodiment, methods 500 and/or 600 may be performed using one or more processing units of client device 104, RAG server 110 of FIG. 1, computing device 200 of FIG. 2, and/or some other computing device or a combination of computing devices. The one or more processing units (e.g., CPUs, GPUs, accelerators, PPUs, DPUs, etc.) performing methods 500 and/or 600 may include (or communicate with) one or more memory devices.

In at least one embodiment, methods 500 and/or 600 may be performed by the same computing device. In at least one embodiment, methods 500 and/or 600 may be performed by different computing devices. In at least one embodiment, processing units performing methods 500 and/or 600 may be executing instructions stored on non-transient computer-readable storage media. In at least one embodiment, methods 500 and/or 600 may be performed using multiple processing threads (e.g., CPU threads and/or GPU threads), with individual threads executing one or more individual functions, routines, subroutines, or operations of the methods. In at least one embodiment, processing threads implementing any of methods 500 and/or 600 may be synchronized (e.g., using semaphores, critical sections, and/or other thread synchronization mechanisms). Alternatively, processing threads implementing any of methods 500 and/or 600 may be executed asynchronously with respect to each other. Various operations of any of methods 500 and/or 600 may be performed in a different order compared with the order shown in FIGS. 5 and 6. Some operations of any of methods 500 and/or 600 may be performed concurrently with other operations. In at least one embodiment, one or more operations shown in FIGS. 5 and 6 may not always be performed.

FIG. 5 is a flow diagram of an example method 500 of deploying a HRAG store for efficient augmentation of inputs into AI models, according to at least one embodiment. In some embodiments, method 500 may be used to process a user query received from a user via a suitable user interface. In some embodiments, the user interface may be located on a different device than the device(s) performing method 500. For example, with reference to FIG. 1, method 500 may be performed by RAG server 110 while the user interface may be on client device 104 remotely communicating with RAG server 110 over a network (e.g., network 140).

At block 510, method 500 may include storing a plurality of documents in a network-based store (NBS). The NBS may include a plurality of stages (e.g., as illustrated in FIG. 3). An individual stage of the plurality of stages may include one or more matrix multiplications and one or more non-linear activations. In some embodiments, storing an individual document of the plurality of documents may include segmenting the individual document into a plurality of segments, causing an embedding model (e.g., embedding model 118 illustrated in FIG. 1 and FIG. 2) to process the plurality of segments to generate a plurality of document features, and using the plurality of document features as an input into the NBS. The individual document may include one or more texts, images, tables, data sets, audio files, and/or the like, or any combination thereof. Segmentation may be performed according to settings that include a size of an individual segment, an amount of overlap between adjacent segments, a choice of an embedding model, and/or any combination thereof.

In some embodiments, the plurality of stages of the NBS may include a label stage (including, e.g., encoder label stage 301-L and decoder label stage 302-L, with reference to FIG. 3). The label stage may be determined using a plurality of auxiliary labels (e.g., auxiliary labels 412, with reference to FIG. 4). In some embodiments, an individual label of the plurality of auxiliary labels may include k bits of a first bit value (e.g., 1) and $N_L$−k bits of a second bit value (e.g., 0), where $N_L$ is at least ten times greater than k.

The label stage may further be determined using a plurality of hidden states (e.g., hidden states 432, with reference to FIG. 4). An individual hidden state of the plurality of hidden states may be determined by a matrix multiplication of a first label matrix (e.g., return label matrix $W_{HL}$) and a corresponding label of the plurality of auxiliary labels. In some embodiments, elements of the first label matrix may be determined based on elements of a second label matrix (e.g., label matrix $W_{HL}$) randomly sampled from a reference distribution (e.g., a normal distribution). As disclosed in conjunction with FIG. 4, the plurality of hidden states may be used to store the one or more documents.

The plurality of stages of the NBS may further include a feature stage (including, e.g, encoder feature stage 201-F and decoder feature stage 302-F, with reference to FIG. 3). The feature stage may include a matrix multiplication of a feature matrix (e.g., $W_{HF}$) and a document feature associated with an individual document of the plurality of documents. The feature matrix may be determined using the plurality of hidden states and at least a subset of the plurality of documents (e.g., as disclosed in conjunction with FIG. 4). In some embodiments, a dimension of the document feature (e.g., $N_F$) may be larger than a dimension of the individual hidden state (e.g., $N_H$). In some embodiments, the number of the plurality of documents is less than a threshold number and the individual retrieved document exactly reproduces the (stored) document. In some embodiments, the number of the plurality of documents is above a threshold number and the individual retrieved document approximately reproduces the (stored) document, an error of reproduction being an increasing function of the number of the plurality of documents.

As illustrated with the top callout block 512 in FIG. 5, in some embodiments, storing one or more documents of the plurality of documents may include modifying one or more parameters of matrix multiplications of at least one stage of the plurality of stages (e.g., as disclosed in conjunction with FIG. 4 and FIG. 6). In some embodiments, modifying the one or more parameters of matrix multiplications may be performed using at least one of Hebbian learning or pseudoinverse learning.

At block 520, method 500 may continue with processing, using the NBS, a query to obtain one or more retrieved documents associated with the query, wherein an individual retrieved document of the one or more retrieved documents at least approximately reproduces a document of the plurality of documents.

In some embodiments, processing the query to obtain the one or more retrieved documents may include one or more operations illustrated with the bottom callout portion of FIG. 5. More specifically, at block 522, method 500 may include processing, using the feature matrix (e.g., feature matrix 310 in FIG. 3), a query feature (e.g., query feature 304) to obtain a hidden encoded state (e.g., hidden encoded state 320) for the query. At block 524, method 500 may continue with processing, using the second label matrix (e.g., label matrix 330), the hidden encoded state for the query to obtain a label state (e.g., label state 340) for the query. At block 526, method 500 may include processing, using the first label matrix (e.g., return label matrix 370), the label state for the query to obtain a hidden decoded state (e.g., hidden decoded state 380) for the query. At block 528, method 500 may continue with processing, using a return feature matrix (e.g., return feature matrix 390), the hidden decoded state for the query to obtain a retrieved feature (e.g., retrieved feature 399) associated with the retrieved individual document.

At block 530, method 500 may include forming a language model prompt based on the query and the one or more retrieved documents. At block 540, method 500 may include processing the prompt using the language model to obtain a response to the query.

FIG. 6 is a flow diagram of an example method 600 of storing documents in an HRAG store for efficient augmentation of inputs into AI models, according to at least one embodiment. At block 610, method 600 may include identifying a set of auxiliary labels (e.g., auxiliary labels 412 with reference to FIG. 4). At block 620, method 600 may include generating elements of a second label matrix (e.g., label matrix $W_{LH}$ 330). At block 630, method 600 may continue with generating a set of hidden states (e.g., hidden states 432). An individual hidden state of the set of hidden states may be generated using a matrix multiplication of a first label matrix and an individual auxiliary label of the set of auxiliary labels. At block 640, method 600 may include generating, using the set of hidden states, a hidden state matrix (e.g., matrix $\hat{H}$ with reference to the description of FIG. 4). At block 650, method 600 may include representing the plurality of documents (e.g., documents 402) via a set of document features (e.g., document features 404). At block 660, method 600 may include storing the plurality of documents encoded via elements of the feature matrix (e.g., feature matrix WAF 310) generated using the hidden state matrix and the set of document features.

The systems and methods described herein may be used for a variety of purposes, by way of example and without limitation, for machine (e.g., robot, vehicle, construction machinery, warehouse vehicles/machines, autonomous, semi-autonomous, and/or other machine types) control, machine locomotion, machine driving, synthetic data generation, model training (e.g., using real, augmented, and/or synthetic data, such as synthetic data generated using a simulation platform or system, synthetic data generation techniques such as but not limited to those described herein, etc.), perception, augmented reality (AR), virtual reality (VR), mixed reality (MR), robotics, security and surveillance (e.g., in a smart cities implementation), autonomous or semi-autonomous machine applications, deep learning, environment simulation, object or actor simulation and/or digital twinning, data center processing, conversational AI, light transport simulation (e.g., ray-tracing, path tracing, etc.), distributed or collaborative content creation for 3D assets (e.g., using universal scene descriptor (USD) data, such as OpenUSD, and/or other data types), cloud computing, generative artificial intelligence (e.g., using one or more diffusion models, transformer models, etc.), and/or any other suitable applications.

Disclosed embodiments may be comprised in a variety of different systems such as automotive systems (e.g., a control system for an autonomous or semi-autonomous machine, a perception system for an autonomous or semi-autonomous machine), in-vehicle infotainment systems (for autonomous or semi-autonomous machines), systems implemented using a robot or robotic platform, aerial systems, medial systems, boating systems, smart area monitoring systems, systems for performing deep learning operations, systems for performing simulation operations (e.g., in a driving or vehicle simulation, in a robotics simulation, in a smart cities or surveillance simulation, etc.), systems for performing digital twin operations (e.g., in conjunction with a collaborative content creation platform or system, such as, without limitation, NVIDIA's OMNIVERSE and/or another platform, system, or service that uses USD or OpenUSD data types), systems implemented using an edge device, systems incorporating one or more virtual machines (VMs), systems for performing synthetic data generation operations (e.g., using one or more neural rendering fields (NERFs), gaussian splat techniques, diffusion models, transformer models, etc.), systems implemented at least partially in a data center, systems for performing conversational AI operations, systems for performing one or more generative AI operations, systems implementing one or more language models-such as one or more large language models (LLMs), one or more vision language models (VLMs), one or more multi-modal language models, etc., systems for performing light transport simulation, systems for performing collaborative content creation for 3D assets (e.g., using universal scene descriptor (USD) data, such as OpenUSD, computer aided design (CAD) data, 2D and/or 3D graphics or design data, and/or other data types), systems implemented at least partially using cloud computing resources, systems for performing one or more medical operations, systems for performing one or more factory operations, systems for performing one or more analytics operations, systems for generating or presenting at least one of virtual reality content, mixed reality content, or augmented reality content, and/or other types of systems.

Inference and Training Logic

Figure 7A:
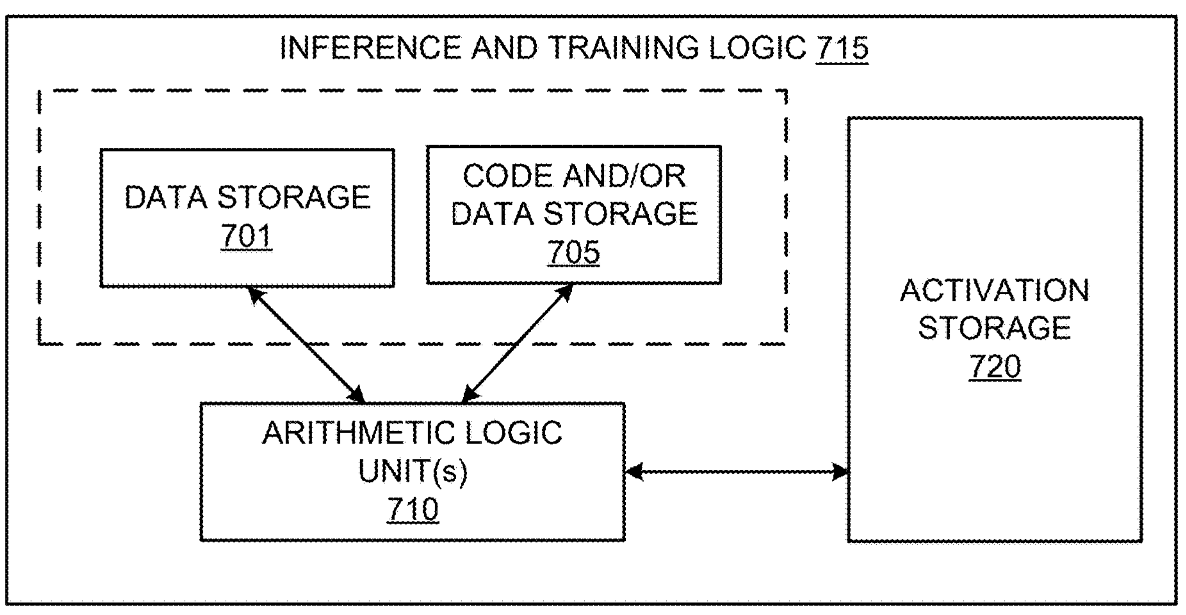
FIG. 7A illustrates inference and/or training logic, according to at least one embodiment.

FIG. 7A illustrates inference and/or training logic 715 used to perform inferencing and/or training operations associated with one or more embodiments.

In at least one embodiment, inference and/or training logic 715 may include, without limitation, code and/or data storage 701 to store forward and/or output weight and/or input/output data, and/or other parameters to configure neurons or layers of a neural network trained and/or used for inferencing in aspects of one or more embodiments. In at least one embodiment, training logic 715 may include, or be coupled to code and/or data storage 701 to store graph code or other software to control timing and/or order, in which weight and/or other parameter information is to be loaded to configure, logic, including integer and/or floating point units (collectively, arithmetic logic units (ALUs) or simply circuits). In at least one embodiment, code, such as graph code, loads weight or other parameter information into processor ALUs based on an architecture of a neural network to which such code corresponds. In at least one embodiment, code and/or data storage 701 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 701 may be included with other on-chip or off-chip data storage, including a processor's L1, L2, or L3 cache or system memory.

In at least one embodiment, any portion of code and/or data storage 701 may be internal or external to one or more processors or other hardware logic devices or circuits. In at least one embodiment, code and/or code and/or data storage 701 may be cache memory, dynamic randomly addressable memory ("DRAM"), static randomly addressable memory ("SRAM"), non-volatile memory (e.g., flash memory), or other storage. In at least one embodiment, a choice of whether code and/or code and/or data storage 701 is internal or external to a processor, for example, or comprising DRAM, SRAM, flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 may include, without limitation, a code and/or data storage 705 to store backward and/or output weight and/or input/output data corresponding to neurons or layers of a neural network trained and/or used for inferencing in aspects of one or more embodiments. In at least one embodiment, code and/or data storage 705 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 715 may include, or be coupled to code and/or data storage 705 to store graph code or other software to control timing and/or order, in which weight and/or other parameter information is to be loaded to configure, logic, including integer and/or floating point units (collectively, arithmetic logic units (ALUs).

In at least one embodiment, code, such as graph code, causes the loading of weight or other parameter information into processor ALUs based on an architecture of a neural network to which such code corresponds. In at least one embodiment, any portion of code and/or data storage 705 may be included with other on-chip or off-chip data storage, including a processor's L1, L2, or L3 cache or system memory. In at least one embodiment, any portion of code and/or data storage 705 may be internal or external to one or more processors or other hardware logic devices or circuits. In at least one embodiment, code and/or data storage 705 may be cache memory, DRAM, SRAM, non-volatile memory (e.g., flash memory), or other storage. In at least one embodiment, a choice of whether code and/or data storage 705 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 701 and code and/or data storage 705 may be separate storage structures. In at least one embodiment, code and/or data storage 701 and code and/or data storage 705 may be a combined storage structure. In at least one embodiment, code and/or data storage 701 and code and/or data storage 705 may be partially combined and partially separate. In at least one embodiment, any portion of code and/or data storage 701 and code and/or data storage 705 may be included with other on-chip or off-chip data storage, including a processor's L1, L2, or L3 cache or system memory.

In at least one embodiment, inference and/or training logic 715 may include, without limitation, one or more arithmetic logic unit(s) ("ALU(s)") 710, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 720 that are functions of input/output and/or weight parameter data stored in code and/or data storage 701 and/or code and/or data storage 705. In at least one embodiment, activations stored in activation storage 720 are generated according to linear algebraic and or matrix-based mathematics performed by ALU(s) 710 in response to performing instructions or other code, wherein weight values stored in code and/or data storage 705 and/or data storage 701 are used as operands along with other values, such as bias values, gradient information, momentum values, or other parameters or hyperparameters, any or all of which may be stored in code and/or data storage 705 or code and/or data storage 701 or another storage on or off-chip.

In at least one embodiment, ALU(s) 710 are included within one or more processors or other hardware logic devices or circuits, whereas in another embodiment, ALU(s) 710 may be external to a processor or other hardware logic device or circuit that uses them (e.g., a coprocessor). In at least one embodiment, ALU(s) 710 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 701, code and/or data storage 705, and activation storage 720 may share a processor or other hardware logic device or circuit, whereas in another embodiment, they may be in different processors or other hardware logic devices or circuits, or some combination of same and different processors or other hardware logic devices or circuits. In at least one embodiment, any portion of activation storage 720 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 720 may be cache memory, DRAM, SRAM, non-volatile memory (e.g., flash memory), or other storage. In at least one embodiment, activation storage 720 may be completely or partially within or external to one or more processors or other logical circuits. In at least one embodiment, a choice of whether activation storage 720 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 illustrated in FIG. 7A may be used in conjunction with an application-specific integrated circuit ("ASIC"), such as a TensorFlow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7A may be used in conjunction with central processing unit ("CPU") hardware, graphics processing unit ("GPU") hardware or other hardware, such as field programmable gate arrays ("FPGAs").

Figure 7B:
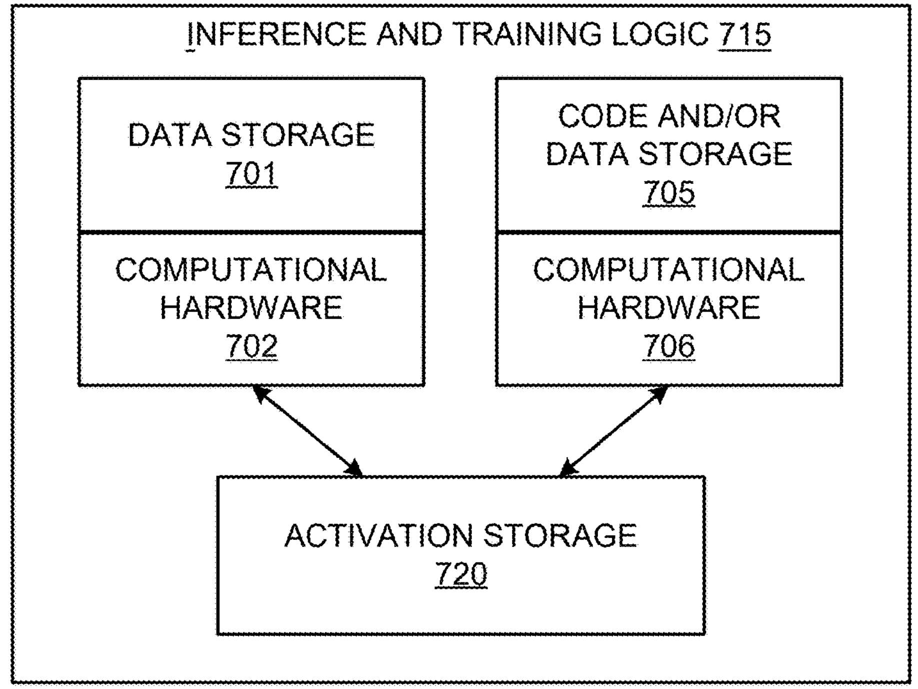
FIG. 7B illustrates inference and/or training logic, according to at least one embodiment.

FIG. 7B illustrates inference and/or training logic 715, according to at least one embodiment. In at least one embodiment, inference and/or training logic 715 may include, without limitation, hardware logic in which computational resources are dedicated or otherwise exclusively used in conjunction with weight values or other information corresponding to one or more layers of neurons within a neural network. In at least one embodiment, inference and/or training logic 715 illustrated in FIG. 7B may be used in conjunction with an application-specific integrated circuit (ASIC), such as TensorFlow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7B may be used in conjunction with central processing unit (CPU) hardware, graphics processing unit (GPU) hardware or other hardware, such as field programmable gate arrays (FPGAs). In at least one embodiment, inference and/or training logic 715 includes, without limitation, code and/or data storage 701 and code and/or data storage 705, which may be used to store code (e.g., graph code), weight values and/or other information, including bias values, gradient information, momentum values, and/or other parameter or hyperparameter information. In at least one embodiment illustrated in FIG. 7B, each of code and/or data storage 701 and code and/or data storage 705 is associated with a dedicated computational resource, such as computational hardware 702 and computational hardware 706, respectively. In at least one embodiment, each of computational hardware 702 and computational hardware 706 comprises one or more ALUs that perform mathematical functions, such as linear algebraic functions, only on information stored in code and/or data storage 701 and code and/or data storage 705, respectively, result of which is stored in activation storage 720.

In at least one embodiment, each of code and/or data storage 701 and 705 and corresponding computational hardware 702 and 706, respectively, correspond to different layers of a neural network, such that resulting activation from one storage/computational pair 701/702 of code and/or data storage 701 and computational hardware 702 is provided as an input to a next storage/computational pair 705/706 of code and/or data storage 705 and computational hardware 706, in order to mirror a conceptual organization of a neural network. In at least one embodiment, each of storage/computational pairs 701/702 and 705/706 may correspond to more than one neural network layer. In at least one embodiment, additional storage/computation pairs (not shown) subsequent to or in parallel with storage/computation pairs 701/702 and 705/706 may be included in inference and/or training logic 715.

Neural Network Training and Deployment

Figure 8:
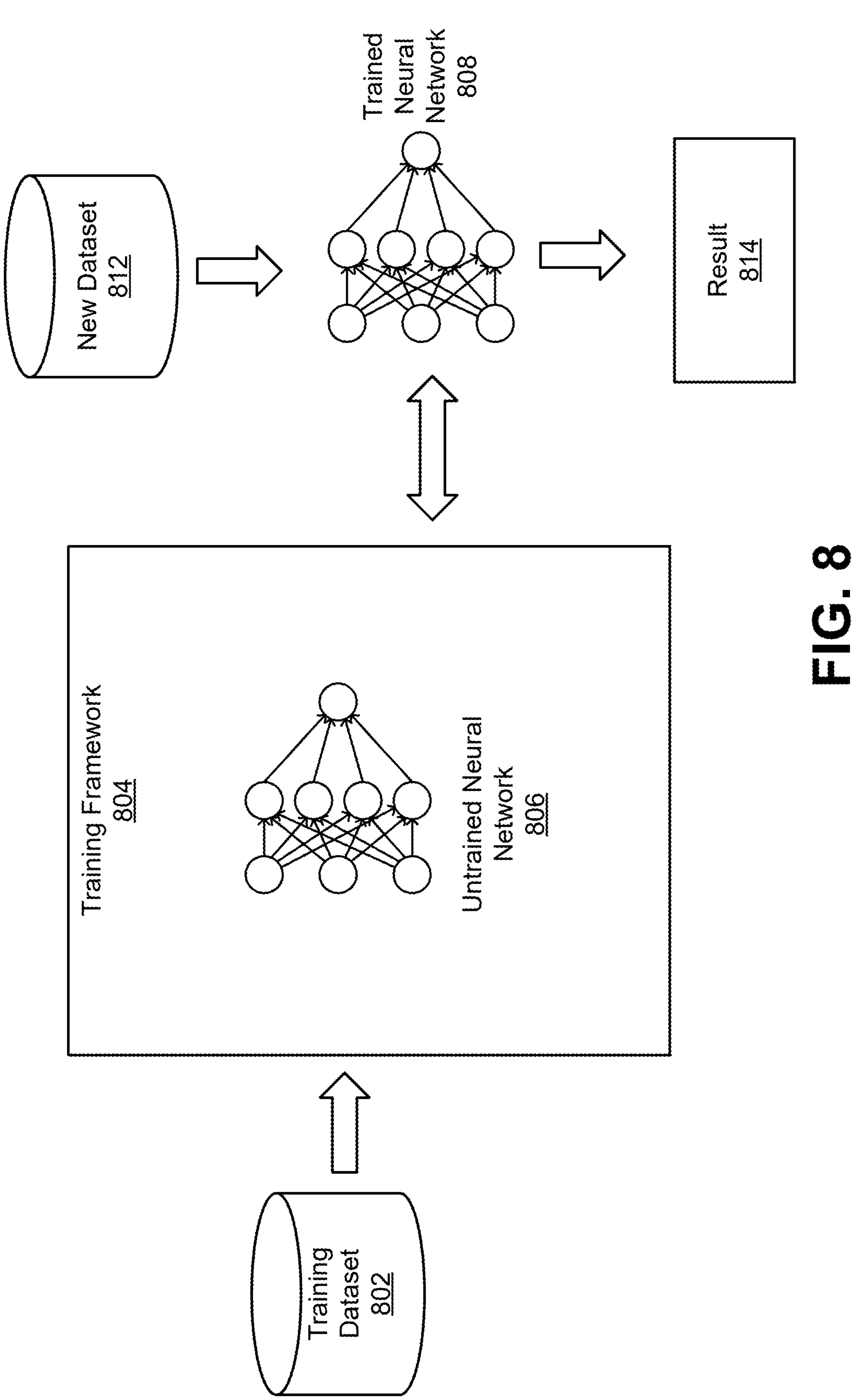
FIG. 8 illustrates training and deployment of a neural network, according to at least one embodiment.

FIG. 8 illustrates training and deployment of a deep neural network, according to at least one embodiment. In at least one embodiment, untrained neural network 806 is trained using a training dataset 802. In at least one embodiment, training framework 804 is a PyTorch framework, whereas in other embodiments, training framework 804 is a TensorFlow, Boost, Caffe, Microsoft Cognitive Toolkit/CNTK, MXNet, Chainer, Keras, Deeplearning4j, or other training framework. In at least one embodiment, training framework 804 trains an untrained neural network 806 and enables it to be trained using processing resources described herein to generate a trained neural network 808. In at least one embodiment, weights may be chosen randomly or by pre-training using a deep belief network. In at least one embodiment, training may be performed in either a supervised, partially supervised, or unsupervised manner.

In at least one embodiment, untrained neural network 806 is trained using supervised learning, wherein training dataset 802 includes an input paired with a desired output for an input, or where training dataset 802 includes input having a known output and an output of neural network 806 is manually graded. In at least one embodiment, untrained neural network 806 is trained in a supervised manner and processes inputs from training dataset 802 and compares resulting outputs against a set of expected or desired outputs. In at least one embodiment, errors are then propagated back through untrained neural network 806. In at least one embodiment, training framework 804 adjusts weights that control untrained neural network 806. In at least one embodiment, training framework 804 includes tools to monitor how well untrained neural network 806 is converging towards a model, such as trained neural network 808, suitable to generating correct answers, such as in result 814, based on input data such as a new dataset 812. In at least one embodiment, training framework 804 trains untrained neural network 806 repeatedly while adjusting weights to refine an output of untrained neural network 806 using a loss function and adjustment algorithm, such as stochastic gradient descent. In at least one embodiment, training framework 804 trains untrained neural network 806 until untrained neural network 806 achieves a desired accuracy. In at least one embodiment, trained neural network 808 can then be deployed to implement any number of machine learning operations.

In at least one embodiment, untrained neural network 806 is trained using unsupervised learning, whereas untrained neural network 806 attempts to train itself using unlabeled data. In at least one embodiment, unsupervised learning training dataset 802 will include input data without any associated output data or "ground truth" data. In at least one embodiment, untrained neural network 806 can learn groupings within training dataset 802 and can determine how individual inputs are related to untrained dataset 802. In at least one embodiment, unsupervised training can be used to generate a self-organizing map in trained neural network 808 capable of performing operations useful in reducing dimensionality of new dataset 812. In at least one embodiment, unsupervised training can also be used to perform anomaly detection, which allows identification of data points in new dataset 812 that deviate from normal patterns of new dataset 812.

In at least one embodiment, semi-supervised learning may be used, which is a technique in which in training dataset 802 includes a mix of labeled and unlabeled data. In at least one embodiment, training framework 804 may be used to perform incremental learning, such as through transferred learning techniques. In at least one embodiment, incremental learning enables trained neural network 808 to adapt to new dataset 812 without forgetting knowledge instilled within trained neural network 808 during initial training.

Figure 9:
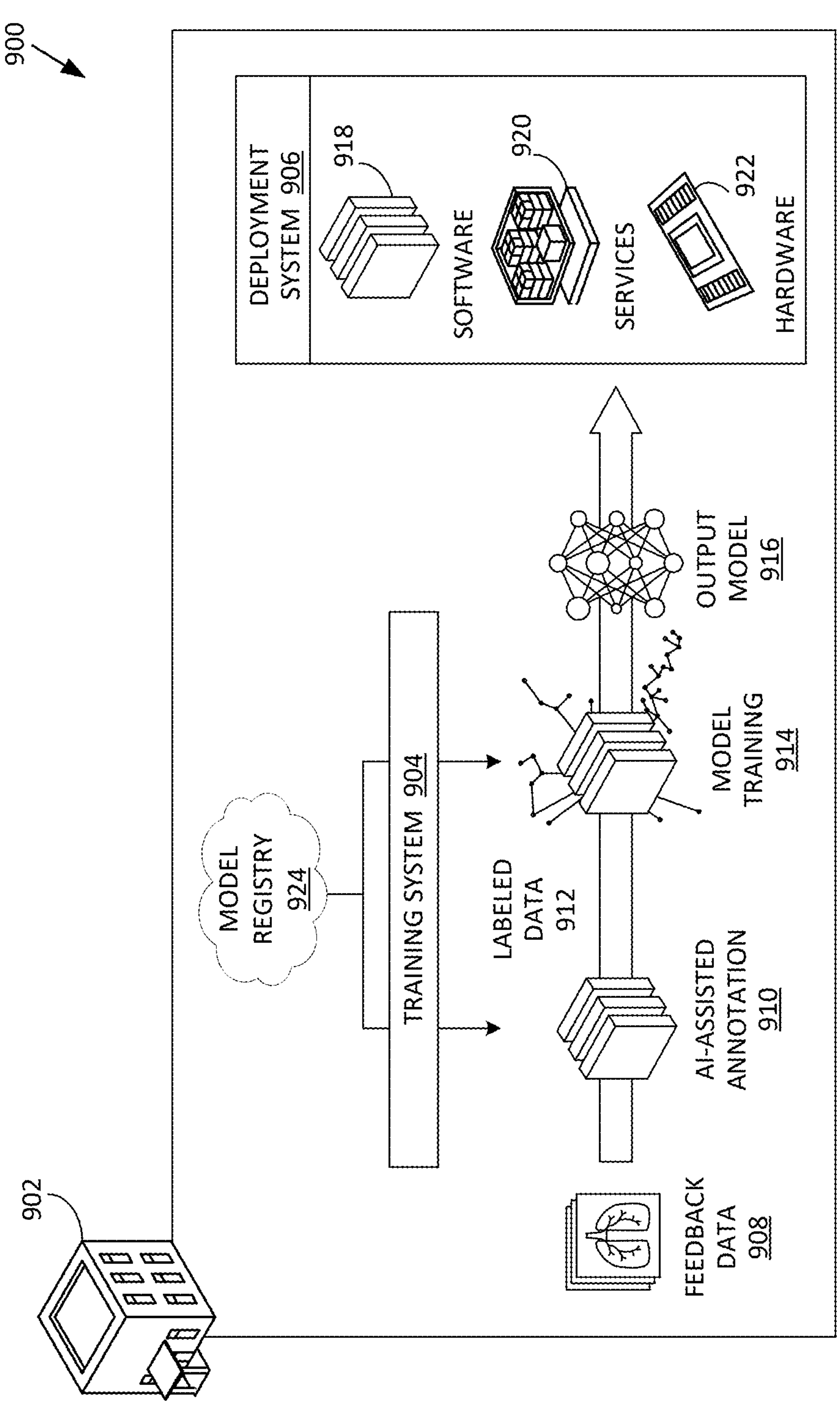
FIG. 9 is an example data flow diagram for an advanced computing pipeline, according to at least one embodiment.

With reference to FIG. 9, FIG. 9 is an example data flow diagram for a process 900 of generating and deploying a processing and inferencing pipeline, according to at least one embodiment. In at least one embodiment, process 900 may be deployed to perform game name recognition analysis and inferencing on user feedback data at one or more facilities 902, such as a data center.

In at least one embodiment, process 900 may be executed within a training system 904 and/or a deployment system 906. In at least one embodiment, training system 904 may be used to perform training, deployment, and embodiment of machine learning models (e.g., neural networks, object detection algorithms, computer vision algorithms, etc.) for use in deployment system 906. In at least one embodiment, deployment system 906 may be configured to offload processing and compute resources among a distributed computing environment to reduce infrastructure requirements at facility 902. In at least one embodiment, deployment system 906 may provide a streamlined platform for selecting, customizing, and implementing virtual instruments for use with computing devices at facility 902. In at least one embodiment, virtual instruments may include software-defined applications for performing one or more processing operations with respect to feedback data. In at least one embodiment, one or more applications in a pipeline may use or call upon services (e.g., inference, visualization, compute, AI, etc.) of deployment system 906 during execution of applications.

In at least one embodiment, some applications used in advanced processing and inferencing pipelines may use machine learning models or other AI to perform one or more processing steps. In at least one embodiment, machine learning models may be trained at facility 902 using feedback data 908 (such as imaging data) stored at facility 902 or feedback data 908 from another facility or facilities, or a combination thereof. In at least one embodiment, training system 904 may be used to provide applications, services, and/or other resources for generating working, deployable machine learning models for deployment system 906.

In at least one embodiment, a model registry 924 may be backed by object storage that may support versioning and object metadata. In at least one embodiment, object storage may be accessible through, for example, a cloud storage (e.g., a cloud 1026 of FIG. 10) compatible application programming interface (API) from within a cloud platform. In at least one embodiment, machine learning models within model registry 924 may be uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, a training pipeline 1004 (FIG. 10) may include a scenario where facility 902 is training their own machine learning model, or has an existing machine learning model that needs to be optimized or updated. In at least one embodiment, feedback data 908 may be received from various channels, such as forums, web forms, or the like. In at least one embodiment, once feedback data 908 is received, AI-assisted annotation 910 may be used to aid in generating annotations corresponding to feedback data 908 to be used as ground truth data for a machine learning model. In at least one embodiment, AI-assisted annotation 910 may include one or more machine learning models (e.g., convolutional neural networks (CNNs)) that may be trained to generate annotations corresponding to certain types of feedback data 908 (e.g., from certain devices) and/or certain types of anomalies in feedback data 908. In at least one embodiment, AI-assisted annotations 910 may then be used directly, or may be adjusted or fine-tuned using an annotation tool, to generate ground truth data. In at least one embodiment, in some examples, labeled data 912 may be used as ground truth data for training a machine learning model. In at least one embodiment, AI-assisted annotations 910, labeled data 912, or a combination thereof may be used as ground truth data for training a machine learning model, e.g., via model training 914 in FIGS. 9-10. In at least one embodiment, a trained machine learning model may be referred to as an output model 916, and may be used by deployment system 906, as described herein.

In at least one embodiment, training pipeline 1004 (FIG. 10) may include a scenario where facility 902 needs a machine learning model for use in performing one or more processing tasks for one or more applications in deployment system 906, but facility 902 may not currently have such a machine learning model (or may not have a model that is optimized, efficient, or effective for such purposes). In at least one embodiment, an existing machine learning model may be selected from model registry 924. In at least one embodiment, model registry 924 may include machine learning models trained to perform a variety of different inference tasks on imaging data. In at least one embodiment, machine learning models in model registry 924 may have been trained on imaging data from different facilities than facility 902 (e.g., facilities that are remotely located). In at least one embodiment, machine learning models may have been trained on imaging data from one location, two locations, or any number of locations. In at least one embodiment, when being trained on imaging data, which may be a form of feedback data 908, from a specific location, training may take place at that location, or at least in a manner that protects confidentiality of imaging data or restricts imaging data from being transferred off-premises (e.g., to comply with HIPAA regulations, privacy regulations, etc.). In at least one embodiment, once a model is trained—or partially trained—at one location, a machine learning model may be added to model registry 924. In at least one embodiment, a machine learning model may then be retrained, or updated, at any number of other facilities, and a retrained or updated model may be made available in model registry 924. In at least one embodiment, a machine learning model may then be selected from model registry 924—and referred to as output model 916—and may be used in deployment system 906 to perform one or more processing tasks for one or more applications of a deployment system.

In at least one embodiment, training pipeline 1004 (FIG. 10) may be used in a scenario that includes facility 902 requiring a machine learning model for use in performing one or more processing tasks for one or more applications in deployment system 906, but facility 902 may not currently have such a machine learning model (or may not have a model that is optimized, efficient, or effective for such purposes). In at least one embodiment, a machine learning model selected from model registry 924 might not be fine-tuned or optimized for feedback data 908 generated at facility 902 because of differences in populations, genetic variations, robustness of training data used to train a machine learning model, diversity in anomalies of training data, and/or other issues with training data. In at least one embodiment, AI-assisted annotation 910 may be used to aid in generating annotations corresponding to feedback data 908 to be used as ground truth data for retraining or updating a machine learning model. In at least one embodiment, labeled data 912 may be used as ground truth data for training a machine learning model. In at least one embodiment, retraining or updating a machine learning model may be referred to as model training 914. In at least one embodiment, model training 914—e.g., AI-assisted annotations 910, labeled data 912, or a combination thereof—may be used as ground truth data for retraining or updating a machine learning model.

In at least one embodiment, deployment system 906 may include software 918, services 920, hardware 922, and/or other components, features, and functionality. In at least one embodiment, deployment system 906 may include a software "stack," such that software 918 may be built on top of services 920 and may use services 920 to perform some or all of processing tasks, and services 920 and software 918 may be built on top of hardware 922 and use hardware 922 to execute processing, storage, and/or other compute tasks of deployment system 906.

In at least one embodiment, software 918 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, for each type of computing device there may be any number of containers that may perform a data processing task with respect to feedback data 908 (or other data types, such as those described herein). In at least one embodiment, an advanced processing and inferencing pipeline may be defined based on selections of different containers that are desired or required for processing feedback data 908, in addition to containers that receive and configure imaging data for use by each container and/or for use by facility 902 after processing through a pipeline (e.g., to convert outputs back to a usable data type for storage and display at facility 902). In at least one embodiment, a combination of containers within software 918 (e.g., that make up a pipeline) may be referred to as a virtual instrument (as described in more detail herein), and a virtual instrument may leverage services 920 and hardware 922 to execute some or all processing tasks of applications instantiated in containers.

In at least one embodiment, data may undergo preprocessing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output models 916 of training system 904.

In at least one embodiment, tasks of data processing pipeline may be encapsulated in one or more container(s) that each represent a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 924 and associated with one or more applications. In at least one embodiment, images of applications (e.g., container images) may be available in a container registry, and once selected by a user from a container registry for deployment in a pipeline, an image may be used to generate a container for an instantiation of an application for use by a user system.

In at least one embodiment, developers may develop, publish, and store applications (e.g., as containers) for performing processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 920 as a system (e.g., system 1000 of FIG. 10). In at least one embodiment, once validated by system 1000 (e.g., for accuracy, etc.), an application may be available in a container registry for selection and/or embodiment by a user (e.g., a hospital, clinic, lab, healthcare provider, etc.) to perform one or more processing tasks with respect to data at a facility (e.g., a second facility) of a user.

Figure 10:
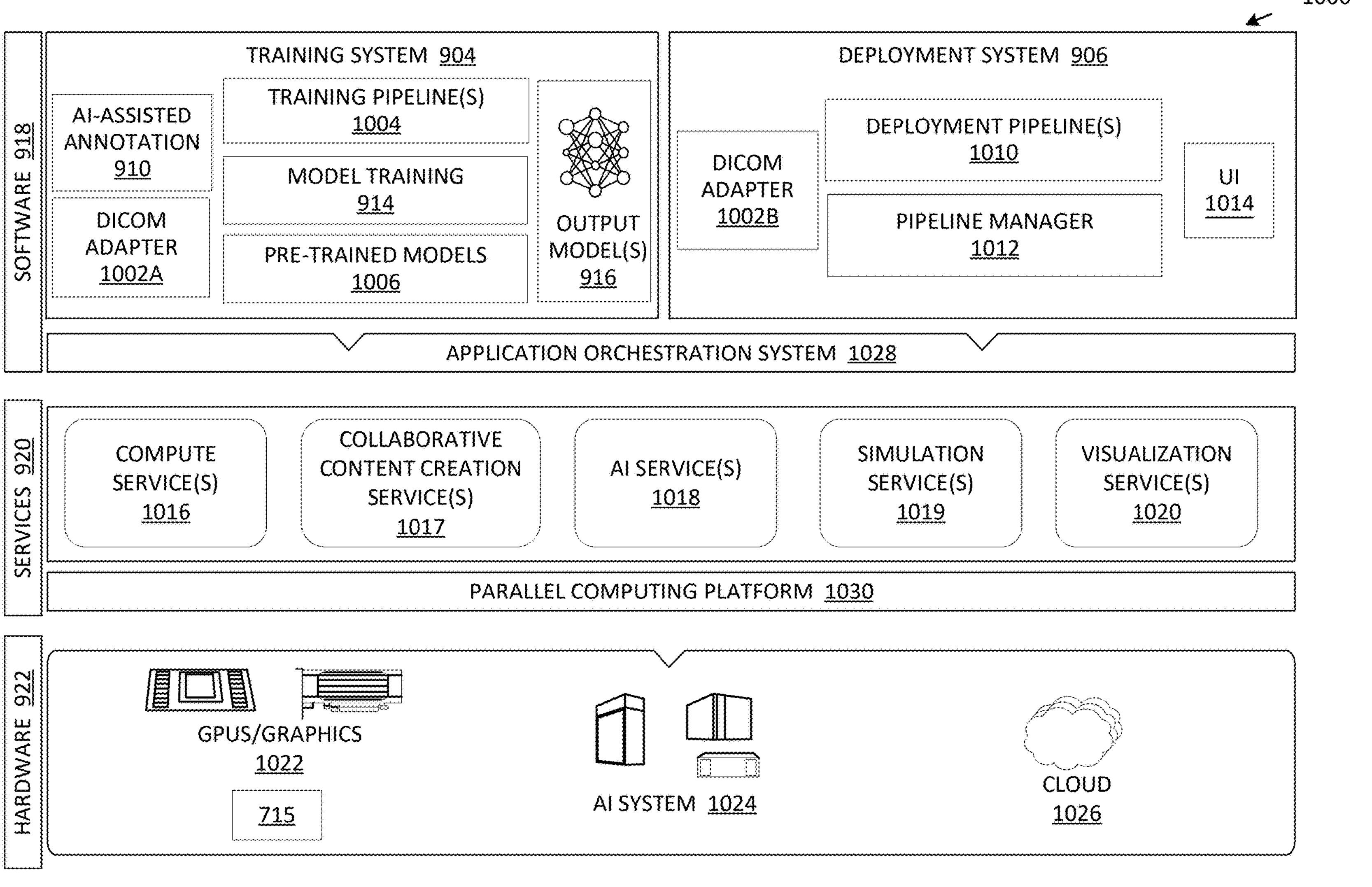
FIG. 10 is a system diagram for an example system for training, adapting, instantiating and deploying machine learning models in an advanced computing pipeline, according to at least one embodiment.

In at least one embodiment, developers may then share applications or containers through a network for access and use by users of a system (e.g., system 1000 of FIG. 10). In at least one embodiment, completed and validated applications or containers may be stored in a container registry and associated machine learning models may be stored in model registry 924. In at least one embodiment, a requesting entity that provides an inference or image processing request may browse a container registry and/or model registry 924 for an application, container, dataset, machine learning model, etc., select a desired combination of elements for inclusion in data processing pipeline, and submit a processing request. In at least one embodiment, a request may include input data that is necessary to perform a request, and/or may include a selection of application(s) and/or machine learning models to be executed in processing a request. In at least one embodiment, a request may then be passed to one or more components of deployment system 906 (e.g., a cloud) to perform processing of a data processing pipeline. In at least one embodiment, processing by deployment system 906 may include referencing selected elements (e.g., applications, containers, models, etc.) from a container registry and/or model registry 924. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 920 may be leveraged. In at least one embodiment, services 920 may include compute services, collaborative content creation services, simulation services, artificial intelligence (AI) services, visualization services, and/or other service types. In at least one embodiment, services 920 may provide functionality that is common to one or more applications in software 918, so functionality may be abstracted to a service that may be called upon or leveraged by applications. In at least one embodiment, functionality provided by services 920 may run dynamically and more efficiently, while also scaling well by allowing applications to process data in parallel, e.g., using a parallel computing platform 1030 (FIG. 10). In at least one embodiment, rather than each application that shares a same functionality offered by a service 920 being required to have a respective instance of service 920, service 920 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities.

In at least one embodiment, where a service 920 includes an AI service (e.g., an inference service), one or more machine learning models associated with an application for anomaly detection (e.g., tumors, growth abnormalities, scarring, etc.) may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 918 implementing advanced processing and inferencing pipeline may be streamlined because each application may call upon the same inference service to perform one or more inferencing tasks.

In at least one embodiment, hardware 922 may include GPUs, CPUs, graphics cards, an AI/deep learning system (e.g., an AI supercomputer, such as NVIDIA's DGX™ supercomputer system), a cloud platform, or a combination thereof. In at least one embodiment, different types of hardware 922 may be used to provide efficient, purpose-built support for software 918 and services 920 in deployment system 906. In at least one embodiment, use of GPU processing may be implemented for processing locally (e.g., at facility 902), within an AI/deep learning system, in a cloud system, and/or in other processing components of deployment system 906 to improve efficiency, accuracy, and efficacy of game name recognition.

In at least one embodiment, software 918 and/or services 920 may be optimized for GPU processing with respect to deep learning, machine learning, and/or high-performance computing, simulation, and visual computing, as non-limiting examples. In at least one embodiment, at least some of the computing environment of deployment system 906 and/or training system 904 may be executed in a datacenter or one or more supercomputers or high performance computing systems, with GPU-optimized software (e.g., hardware and software combination of NVIDIA's DGX™ system). In at least one embodiment, hardware 922 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform (e.g., NVIDIA's NGC™) may be executed using an AI/deep learning supercomputer(s) and/or GPU-optimized software (e.g., as provided on NVIDIA's DGX™ systems) as a hardware abstraction and scaling platform. In at least one embodiment, cloud platform may integrate an application container clustering system or orchestration system (e.g., KUBERNETES) on multiple GPUs to enable seamless scaling and load balancing.

FIG. 10 is a system diagram for an example system 1000 for generating and deploying a deployment pipeline, according to at least one embodiment. In at least one embodiment, system 1000 may be used to implement process 900 of FIG. 9 and/or other processes including advanced processing and inferencing pipelines. In at least one embodiment, system 1000 may include training system 904 and deployment system 906. In at least one embodiment, training system 904 and deployment system 906 may be implemented using software 918, services 920, and/or hardware 922, as described herein.

In at least one embodiment, system 1000 (e.g., training system 904 and/or deployment system 906) may be implemented in a cloud computing environment (e.g., using cloud 1026). In at least one embodiment, system 1000 may be implemented locally with respect to a facility, or as a combination of both cloud and local computing resources. In at least one embodiment, access to APIs in cloud 1026 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 1000, may be restricted to a set of public internet service providers (ISPs) that have been vetted or authorized for interaction.

In at least one embodiment, various components of system 1000 may communicate between and among one another using any of a variety of different network types, including but not limited to local area networks (LANs) and/or wide area networks (WANs) via wired and/or wireless communication protocols. In at least one embodiment, communication between facilities and components of system 1000 (e.g., for transmitting inference requests, for receiving results of inference requests, etc.) may be communicated over a data bus or data busses, wireless data protocols (Wi-Fi), wired data protocols (e.g., Ethernet), etc.

In at least one embodiment, training system 904 may execute training pipelines 1004, similar to those described herein with respect to FIG. 9. In at least one embodiment, where one or more machine learning models are to be used in deployment pipelines 1010 by deployment system 906, training pipelines 1004 may be used to train or retrain one or more (e.g., pre-trained) models, and/or implement one or more of pre-trained models 1006 (e.g., without a need for retraining or updating). In at least one embodiment, as a result of training pipelines 1004, output model(s) 916 may be generated. In at least one embodiment, training pipelines 1004 may include any number of processing steps, AI-assisted annotation 910, labeling or annotating of feedback data 908 to generate labeled data 912, model selection from a model registry, model training 914, training, retraining, or updating models, and/or other processing steps. In at least one embodiment, for different machine learning models used by deployment system 906, different training pipelines 1004 may be used. In at least one embodiment, training pipeline 1004, similar to a first example described with respect to FIG. 9, may be used for a first machine learning model, training pipeline 1004, similar to a second example described with respect to FIG. 9, may be used for a second machine learning model, and training pipeline 1004, similar to a third example described with respect to FIG. 9, may be used for a third machine learning model. In at least one embodiment, any combination of tasks within training system 904 may be used depending on what is required for each respective machine learning model. In at least one embodiment, one or more of machine learning models may already be trained and ready for deployment so machine learning models may not undergo any processing by training system 904, and may be implemented by deployment system 906.

In at least one embodiment, output model(s) 916 and/or pre-trained model(s) 1006 may include any types of machine learning models depending on embodiment. In at least one embodiment, and without limitation, machine learning models used by system 1000 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Bi-LSTM, Hopfield, Boltzmann, deep belief, deconvolutional, generative adversarial, liquid state machine, etc.), and/or other types of machine learning models.

In at least one embodiment, training pipelines 1004 may include AI-assisted annotation. In at least one embodiment, labeled data 912 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of feedback data 908 (or other data type used by machine learning models), there may be corresponding ground truth data generated by training system 904. In at least one embodiment, AI-assisted annotation may be performed as part of deployment pipelines 1010; either in addition to, or in lieu of, AI-assisted annotation included in training pipelines 1004. In at least one embodiment, system 1000 may include a multi-layer platform that may include a software layer (e.g., software 918) of diagnostic applications (or other application types) that may perform one or more medical imaging and diagnostic functions.

In at least one embodiment, a software layer may be implemented as a secure, encrypted, and/or authenticated API through which applications or containers may be invoked (e.g., called) from an external environment(s), e.g., facility 902. In at least one embodiment, applications may then call or execute one or more services 920 for performing compute, AI, or visualization tasks associated with respective applications, and software 918 and/or services 920 may leverage hardware 922 to perform processing tasks in an effective and efficient manner.

In at least one embodiment, deployment system 906 may execute deployment pipelines 1010. In at least one embodiment, deployment pipelines 1010 may include any number of applications that may be sequentially, non-sequentially, or otherwise applied to feedback data (and/or other data types), including AI-assisted annotation, as described above. In at least one embodiment, as described herein, a deployment pipeline 1010 for an individual device may be referred to as a virtual instrument for a device. In at least one embodiment, for a single device, there may be more than one deployment pipeline 1010 depending on information desired from data generated by a device.

In at least one embodiment, applications available for deployment pipelines 1010 may include any application that may be used for performing processing tasks on feedback data or other data from devices. In at least one embodiment, because various applications may share common image operations, in some embodiments, a data augmentation library (e.g., as one of services 920) may be used to accelerate these operations. In at least one embodiment, to avoid bottlenecks of conventional processing approaches that rely on CPU processing, parallel computing platform 1030 may be used for GPU acceleration of these processing tasks.

In at least one embodiment, deployment system 906 may include a user interface (UI) 1014 (e.g., a graphical user interface, a web interface, etc.) that may be used to select applications for inclusion in deployment pipeline(s) 1010, arrange applications, modify or change applications or parameters or constructs thereof, use and intera with deployment pipeline(s) 1010 during set-up and/or deployment, and/or to otherwise interact with deployment system 906. In at least one embodiment, although not illustrated with respect to training system 904, UI 1014 (or a different user interface) may be used for selecting models for use in deployment system 906, for selecting models for training, or retraining, in training system 904, and/or for otherwise interacting with training system 904. In at least one embodiment, training system 904 and deployment system 906 may include DICOM adapters 1002A and 1002B.

In at least one embodiment, pipeline manager 1012 may be used, in addition to an application orchestration system 1028, to manage interaction between applications or containers of deployment pipeline(s) 1010 and services 920 and/or hardware 922. In at least one embodiment, pipeline manager 1012 may be configured to facilitate interactions from application to application, from application to service 920, and/or from application or service to hardware 922. In at least one embodiment, although illustrated as included in software 918, this is not intended to be limiting, and in some examples pipeline manager 1012 may be included in services 920. In at least one embodiment, application orchestration system 1028 (e.g., Kubernetes, DOCKER, etc.) may include a container orchestration system that may group applications into containers as logical units for coordination, management, scaling, and deployment. In at least one embodiment, by associating applications from deployment pipeline(s) 1010 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of other application(s) or container(s). In at least one embodiment, communication, and cooperation between different containers or applications may be aided by pipeline manager 1012 and application orchestration system 1028. In at least one embodiment, so long as an expected input and/or output of each container or application is known by a system (e.g., based on constructs of applications or containers), application orchestration system 1028 and/or pipeline manager 1012 may facilitate communication among and between, and sharing of resources among and between, each of applications or containers. In at least one embodiment, because one or more of applications or containers in deployment pipeline(s) 1010 may share the same services and resources, application orchestration system 1028 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, the scheduler may thus allocate resources to different applications and distribute resources between and among applications in view of requirements and availability of a system. In some examples, the scheduler (and/or other component of application orchestration system 1028) may determine resource availability and distribution based on constraints imposed on a system (e.g., user constraints), such as quality of service (QoS), urgency of need for data outputs (e.g., to determine whether to execute real-time processing or delayed processing), etc.

In at least one embodiment, services 920 leveraged and shared by applications or containers in deployment system 906 may include compute services 1016, collaborative content creation services 1017, AI services 1018, simulation services 1019, visualization services 1020, and/or other service types. In at least one embodiment, applications may call (e.g., execute) one or more of services 920 to perform processing operations for an application. In at least one embodiment, compute services 1016 may be leveraged by applications to perform super-computing or other high-performance computing (HPC) tasks. In at least one embodiment, compute service(s) 1016 may be leveraged to perform parallel processing (e.g., using a parallel computing platform 1030) for processing data through one or more of applications and/or one or more tasks of a single application, substantially simultaneously. In at least one embodiment, parallel computing platform 1030 (e.g., NVIDIA's CUDA®) may enable general purpose computing on GPUs (GPGPU) (e.g., GPUs 1022). In at least one embodiment, a software layer of parallel computing platform 1030 may provide access to virtual instruction sets and parallel computational elements of GPUs, for execution of compute kernels. In at least one embodiment, parallel computing platform 1030 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1030 (e.g., where multiple different stages of an application or multiple applications are processing same information). In at least one embodiment, rather than making a copy of data and moving data to different locations in memory (e.g., a read/write operation), same data in the same location of a memory may be used for any number of processing tasks (e.g., at the same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI services 1018 may be leveraged to perform inferencing services for executing machine learning model(s) associated with applications (e.g., tasked with performing one or more processing tasks of an application). In at least one embodiment, AI services 1018 may leverage AI system 1024 to execute machine learning model(s) (e.g., neural networks, such as CNNs) for segmentation, reconstruction, object detection, feature detection, classification, and/or other inferencing tasks. In at least one embodiment, applications of deployment pipeline(s) 1010 may use one or more of output models 916 from training system 904 and/or other models of applications to perform inference on imaging data (e.g., DICOM data, RIS data, CIS data, REST compliant data, RPC data, raw data, etc.). In at least one embodiment, two or more examples of inferencing using application orchestration system 1028 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1028 may distribute resources (e.g., services 920 and/or hardware 922) based on priority paths for different inferencing tasks of AI services 1018.

In at least one embodiment, shared storage may be mounted to AI services 1018 within system 1000. In at least one embodiment, shared storage may operate as a cache (or other storage device type) and may be used to process inference requests from applications. In at least one embodiment, when an inference request is submitted, a request may be received by a set of API instances of deployment system 906, and one or more instances may be selected (e.g., for best fit, for load balancing, etc.) to process a request. In at least one embodiment, to process a request, a request may be entered into a database, a machine learning model may be located from model registry 924 if not already in a cache, a validation step may ensure appropriate machine learning model is loaded into a cache (e.g., shared storage), and/or a copy of a model may be saved to a cache. In at least one embodiment, the scheduler (e.g., of pipeline manager 1012) may be used to launch an application that is referenced in a request if an application is not already running or if there are not enough instances of an application. In at least one embodiment, if an inference server is not already launched to execute a model, an inference server may be launched. In at least one embodiment, any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as the inference server is running as a different instance.

In at least one embodiment, during application execution, an inference request for a given application may be received, and a container (e.g., hosting an instance of an inference server) may be loaded (if not already loaded), and a start procedure may be called. In at least one embodiment, pre-processing logic in a container may load, decode, and/or perform any additional pre-processing on incoming data (e.g., using a CPU(s) and/or GPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (turnaround time less than one minute) priority while others may have lower priority (e.g., turnaround less than 10 minutes). In at least one embodiment, model execution times may be measured from requesting institution or entity and may include partner network traversal time, as well as execution on an inference service.

In at least one embodiment, transfer of requests between services 920 and inference applications may be hidden behind a software development kit (SDK), and robust transport may be provided through a queue. In at least one embodiment, a request is placed in a queue via an API for an individual application/tenant ID combination and an SDK pulls a request from a queue and gives a request to an application. In at least one embodiment, a name of a queue may be provided in an environment from where an SDK picks up the request. In at least one embodiment, asynchronous communication through a queue may be useful as it may allow any instance of an application to pick up work as it becomes available. In at least one embodiment, results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1026, and an inference service may perform inferencing on a GPU.

In at least one embodiment, visualization services 1020 may be leveraged to generate visualizations for viewing outputs of applications and/or deployment pipeline(s) 1010. In at least one embodiment, GPUs 1022 may be leveraged by visualization services 1020 to generate visualizations. In at least one embodiment, rendering effects, such as ray-tracing or other light transport simulation techniques, may be implemented by visualization services 1020 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 1020 may include an internal visualizer, cinematics, and/or other rendering or image processing capabilities or functionality (e.g., ray tracing, rasterization, internal optics, etc.).

In at least one embodiment, hardware 922 may include GPUs 1022, AI system 1024, cloud 1026, and/or any other hardware used for executing training system 904 and/or deployment system 906. In at least one embodiment, GPUs 1022 (e.g., NVIDIA's TESLA®) and/or QUADRO® GPUs) may include any number of GPUs that may be used for executing processing tasks of compute services 1016, collaborative content creation services 1017, AI services 1018, simulation services 1019, visualization services 1020, other services, and/or any of features or functionality of software 918. For example, with respect to AI services 1018, GPUs 1022 may be used to perform pre-processing on imaging data (or other data types used by machine learning models), post-processing on outputs of machine learning models, and/or to perform inferencing (e.g., to execute machine learning models). In at least one embodiment, cloud 1026, AI system 1024, and/or other components of system 1000 may use GPUs 1022. In at least one embodiment, cloud 1026 may include a GPU-optimized platform for deep learning tasks. In at least one embodiment, AI system 1024 may use GPUs, and cloud 1026—or at least a portion tasked with deep learning or inferencing—may be executed using one or more AI systems 1024. As such, although hardware 922 is illustrated as discrete components, this is not intended to be limiting, and any components of hardware 922 may be combined with, or leveraged by, any other components of hardware 922.

In at least one embodiment, AI system 1024 may include a purpose-built computing system (e.g., a super-computer or an HPC) configured for inferencing, deep learning, machine learning, and/or other artificial intelligence tasks. In at least one embodiment, AI system 1024 (e.g., NVIDIA's DGX™) may include GPU-optimized software (e.g., a software stack) that may be executed using a plurality of GPUs 1022, in addition to CPUs, RAM, storage, and/or other components, features, or functionality. In at least one embodiment, one or more AI systems 1024 may be implemented in cloud 1026 (e.g., in a data center) for performing some or all of AI-based processing tasks of system 1000.

In at least one embodiment, cloud 1026 may include a GPU-accelerated infrastructure (e.g., NVIDIA's NGC™) that may provide a GPU-optimized platform for executing processing tasks of system 1000. In at least one embodiment, cloud 1026 may include an AI system(s) 1024 for performing one or more of AI-based tasks of system 1000 (e.g., as a hardware abstraction and scaling platform). In at least one embodiment, cloud 1026 may integrate with application orchestration system 1028 leveraging multiple GPUs to enable seamless scaling and load balancing between and among applications and services 920. In at least one embodiment, cloud 1026 may be tasked with executing at least some of services 920 of system 1000, including compute services 1016, AI services 1018, and/or visualization services 1020, as described herein. In at least one embodiment, cloud 1026 may perform small and large batch inference (e.g., executing NVIDIA's TensorRT™), provide an accelerated parallel computing API and platform 1030 (e.g., NVIDIA's CUDA®), execute application orchestration system 1028 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1000.

In at least one embodiment, in an effort to preserve patient confidentiality (e.g., where patient data or records are to be used off-premises), cloud 1026 may include a registry, such as a deep learning container registry. In at least one embodiment, a registry may store containers for instantiations of applications that may perform pre-processing, post-processing, or other processing tasks on patient data. In at least one embodiment, cloud 1026 may receive data that includes patient data as well as sensor data in containers, perform requested processing for just sensor data in those containers, and then forward a resultant output and/or visualizations to appropriate parties and/or devices (e.g., on-premises medical devices used for visualization or diagnoses), all without having to extract, store, or otherwise access patient data. In at least one embodiment, confidentiality of patient data is preserved in compliance with HIPAA and/or other data regulations.

Example Language Models

In at least some embodiments, language models, such as large language models (LLMs), vision language models (VLMs), multi-modal language models (MMLMs), and/or other types of generative artificial intelligence (AI) may be implemented. These models may be capable of understanding, summarizing, translating, and/or otherwise generating text (e.g., natural language text, code, etc.), images, video, computer aided design (CAD) assets, OMNIVERSE and/or META VERSE file information (e.g., in USD format, such as OpenUSD), and/or the like, based on the context provided in input prompts or queries. These language models may be considered "large," in embodiments, based on the models being trained on massive datasets and having architectures with large number of learnable network parameters (weights and biases)—such as millions or billions of parameters. The LLMs/VLMs/MMLMs/etc. may be implemented for summarizing textual data, analyzing and extracting insights from data (e.g., textual, image, video, etc.), and generating new text/image/video/etc. in user-specified styles, tones, and/or formats. The LLMs/VLMs/MMLMs/etc. of the present disclosure may be used exclusively for text processing, in embodiments, whereas in other embodiments, multi-modal LLMs may be implemented to accept, understand, and/or generate text and/or other types of content like images, audio, 2D and/or 3D data (e.g., in USD formats), and/or video. For example, vision language models (VLMs), or more generally multi-modal language models (MMLMs), may be implemented to accept image, video, audio, textual, 3D design (e.g., CAD), and/or other inputs data types and/or to generate or output image, video, audio, textual, 3D design, and/or other output data types.

Various types of LLMs/VLMs/MMLMs/etc. architectures may be implemented in various embodiments. For example, different architectures may be implemented that use different techniques for understanding and generating outputs-such as text, audio, video, image, 2D and/or 3D design or asset data, etc. In some embodiments, LLMs/VLMs/MMLMs/etc. architectures such as recurrent neural networks (RNNs) or long short-term memory networks (LSTMs) may be used, while in other embodiments transformer architectures—such as those that rely on self-attention and/or cross-attention (e.g., between contextual data and textual data) mechanisms—may be used to understand and recognize relationships between words or tokens and/or contextual data (e.g., other text, video, image, design data, USD, etc.). One or more generative processing pipelines that include LLMs/VLMs/MMLMs/etc. may also include one or more diffusion block(s) (e.g., denoisers). The LLMs/VLMs/MMLMs/etc. of the present disclosure may include encoder and/or decoder block(s). For example, discriminative or encoder-only models like BERT (Bidirectional Encoder Representations from Transformers) may be implemented for tasks that involve language comprehension such as classification, sentiment analysis, question answering, and named entity recognition. As another example, generative or decoder-only models like GPT (Generative Pretrained Transformer) may be implemented for tasks that involve language and content generation such as text completion, story generation, and dialogue generation. LLMs/VLMs/MMLMs/etc. that include both encoder and decoder components like T5 (Text-to-Text Transformer) may be implemented to understand and generate content, such as for translation and summarization. These examples are not intended to be limiting, and any architecture type—including but not limited to those described herein—may be implemented depending on the particular embodiment and the task(s) being performed using the LLMs/VLMs/MMLMs/etc.

In various embodiments, the LLMs/VLMs/MMLMs/etc. may be trained using unsupervised learning, in which an LLMs/VLMs/MMLMs/etc. learns patterns from large amounts of unlabeled text/audio/video/image/design/USD/etc. data. Due to the extensive training, in embodiments, the models may not require task-specific or domain-specific training. LLMs/VLMs/MMLMs/etc. that have undergone extensive pre-training on vast amounts of unlabeled data may be referred to as foundation models and may be adept at a variety of tasks like question-answering, summarization, filling in missing information, translation, image/video/design/USD/data generation. Some LLMs/VLMs/MMLMs/etc. may be tailored for a specific use case using techniques like prompt tuning, fine-tuning, retrieval augmented generation (RAG), adding adapters (e.g., customized neural networks, and/or neural network layers, that tune or adjust prompts or tokens to bias the language model toward a particular task or domain), and/or using other fine-tuning or tailoring techniques that optimize the models for use on particular tasks and/or within particular domains.

In some embodiments, the LLMs/VLMs/MMLMs/etc. of the present disclosure may be implemented using various model alignment techniques. For example, in some embodiments, guardrails may be implemented to identify improper or undesired inputs (e.g., prompts) and/or outputs of the models. In doing so, the system may use the guardrails and/or other model alignment techniques to either prevent a particular undesired input from being processed using the LLMs/VLMs/MMLMs/etc., and/or preventing the output or presentation (e.g., display, audio output, etc.) of information generating using the LLMs/VLMs/MMLMs/etc. In some embodiments, one or more additional models—or layers thereof—may be implemented to identify issues with inputs and/or outputs of the models. For example, these "safeguard" models may be trained to identify inputs and/or outputs that are "safe" or otherwise okay or desired and/or that are "unsafe" or are otherwise undesired for the particular application/implementation. As a result, the LLMs/VLMs/MMLMs/etc. of the present disclosure may be less likely to output language/text/audio/video/design data/USD data/etc. that may be offensive, vulgar, improper, unsafe, out of domain, and/or otherwise undesired for the particular application/implementation.

In some embodiments, the LLMs/VLMs/etc. may be configured to or capable of accessing or using one or more plug-ins, application programming interfaces (APIs), databases, data stores, repositories, etc. For example, for certain tasks or operations that the model is not ideally suited for, the model may have instructions (e.g., as a result of training, and/or based on instructions in a given prompt) to access one or more plug-ins (e.g., 3$^{rd}$ party plugins) for help in processing the current input. In such an example, where at least part of a prompt is related to restaurants or weather, the model may access one or more restaurant or weather plug-ins (e.g., via one or more APIs) to retrieve the relevant information. As another example, where at least part of a response requires a mathematical computation, the model may access one or more math plug-ins or APIs for help in solving the problem(s), and may then use the response from the plug-in and/or API in the output from the model. This process may be repeated—e.g., recursively—for any number of iterations and using any number of plug-ins and/or APIs until a response to the input prompt can be generated that addresses each ask/question/request/process/operation/etc. As such, the model(s) may not only rely on its own knowledge from training on a large dataset(s), but also on the expertise or optimized nature of one or more external resources—such as APIs, plug-ins, and/or the like.

In some embodiments, multiple language models (e.g., LLMs/VLMs/MMLMs/etc., multiple instances of the same language model, and/or multiple prompts provided to the same language model or instance of the same language model may be implemented, executed, or accessed (e.g., using one or more plug-ins, user interfaces, APIs, databases, data stores, repositories, etc.) to provide output responsive to the same query, or responsive to separate portions of a query. In at least one embodiment, multiple language models e.g., language models with different architectures, language models trained on different (e.g. updated) corpuses of data may be provided with the same input query and prompt (e.g., set of constraints, conditioners, etc.). In one or more embodiments, the language models may be different versions of the same foundation model. In one or more embodiments, at least one language model may be instantiated as multiple agents—e.g., more than one prompt may be provided to constrain, direct, or otherwise influence a style, a content, or a character, etc., of the output provided. In one or more example, non-limiting embodiments, the same language model may be asked to provide output corresponding to a different role, perspective, character, or having a different base of knowledge, etc.—as defined by a supplied prompt.

In any one of such embodiments, the output of two or more (e.g., each) language models, two or more versions of at least one language model, two or more instanced agents of at least one language model, and/or two more prompts provided to at least one language model may be further processed, e.g., aggregated, compared or filtered against, or used to determine (and provide) a consensus response. In one or more embodiments, the output from one language model—or version, instance, or agent—maybe be provided as input to another language model for further processing and/or validation. In one or more embodiments, a language model may be asked to generate or otherwise obtain an output with respect to an input source material, with the output being associated with the input source material. Such an association may include, for example, the generation of a caption or portion of text that is embedded (e.g., as metadata) with an input source text or image. In one or more embodiments, an output of a language model may be used to determine the validity of an input source material for further processing, or inclusion in a dataset. For example, a language model may be used to assess the presence (or absence) of a target word in a portion of text or an object in an image, with the text or image being annotated to note such presence (or lack thereof). Alternatively, the determination from the language model may be used to determine whether the source material should be included in a curated dataset, for example and without limitation.

Figure 11A:
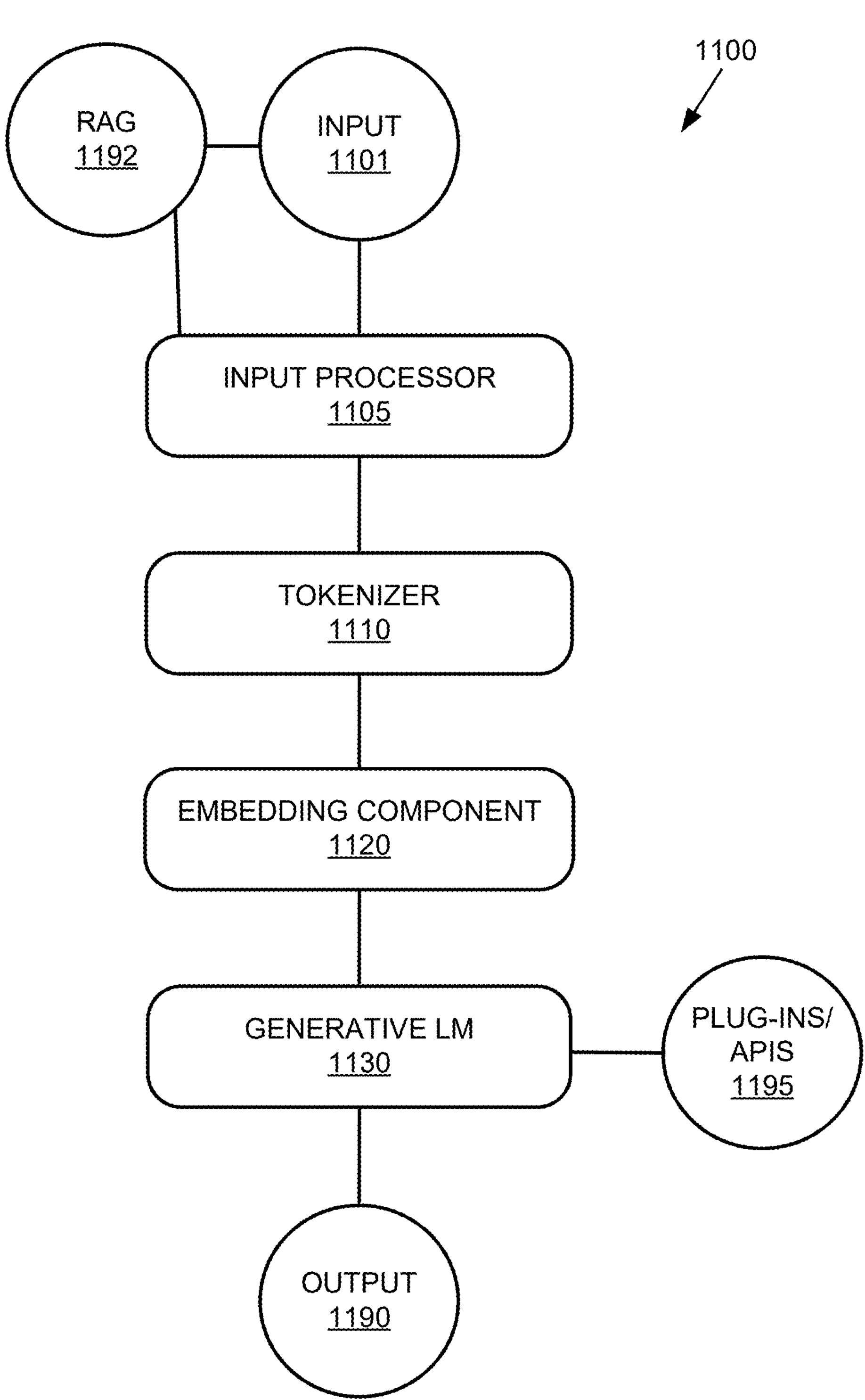
FIG. 11A is a block diagram of an example generative language model system suitable for use in implementing at least some embodiments of the present disclosure.

FIG. 11A is a block diagram of an example generative language model system 1100 suitable for use in implementing at least some embodiments of the present disclosure. In the example illustrated in FIG. 11A, the generative language model system 1100 includes a retrieval augmented generation (RAG) component 1192, an input processor 1105, a tokenizer 1110, an embedding component 1120, plug-ins/APIs 1195, and a generative language model (LM) 1130 (which may include an LLM, a VLM, a multi-modal LM, etc.).

At a high level, the input processor 1105 may receive an input 1101 comprising text and/or other types of input data (e.g., audio data, video data, image data, sensor data (e.g., LiDAR, RADAR, ultrasonic, etc.), 3D design data, CAD data, universal scene descriptor (USD) data-such as OpenUSD, etc.), depending on the architecture of the generative LM 1130 (e.g., LLM/VLM/MMLM/etc.). In some embodiments, the input 1101 includes plain text in the form of one or more sentences, paragraphs, and/or documents. Additionally or alternatively, the input 1101 may include numerical sequences, precomputed embeddings (e.g., word or sentence embeddings), and/or structured data (e.g., in tabular formats, JSON, or XML). In some implementations in which the generative LM 1130 is capable of processing multi-modal inputs, the input 1101 may combine text (or may omit text) with image data, audio data, video data, design data, USD data, and/or other types of input data, such as but not limited to those described herein. Taking raw input text as an example, the input processor 1105 may prepare raw input text in various ways. For example, the input processor 1105 may perform various types of text filtering to remove noise (e.g., special characters, punctuation, HTML tags, stopwords, portions of an image(s), portions of audio, etc.) from relevant textual content. In an example involving stopwords (common words that tend to carry little semantic meaning), the input processor 1105 may remove stopwords to reduce noise and focus the generative LM 1130 on more meaningful content. The input processor 1105 may apply text normalization, for example, by converting all characters to lowercase, removing accents, and/or or handling special cases like contractions or abbreviations to ensure consistency. These are just a few examples, and other types of input processing may be applied.

In some embodiments, a RAG component 1192 (which may include one or more RAG models, and/or may be performed using the generative LM 1130 itself) may be used to retrieve additional information to be used as part of the input 1101 or prompt. RAG may be used to enhance the input to the LLM/VLM/MMLM/etc. with external knowledge, so that answers to specific questions or queries or requests are more relevant-such as in a case where specific knowledge is required. The RAG component 1192 may fetch this additional information (e.g., grounding information, such as grounding text/image/video/audio/USD/CAD/etc.) from one or more external sources, which can then be fed to the LLM/VLM/MMLM/etc. along with the prompt to improve accuracy of the responses or outputs of the model.

For example, in some embodiments, the input 1101 may be generated using the query or input to the model (e.g., a question, a request, etc.) in addition to data retrieved using the RAG component 1192. In some embodiments, the input processor 1105 may analyze the input 1101 and communicate with the RAG component 1192 (or the RAG component 1192 may be part of the input processor 1105, in embodiments) in order to identify relevant text and/or other data to provide to the generative LM 1130 as additional context or sources of information from which to identify the response, answer, or output 1190, generally. For example, where the input indicates that the user is interested in a desired tire pressure for a particular make and model of vehicle, the RAG component 1192 may retrieve—using a RAG model performing a vector search in an embedding space, for example—the tire pressure information or the text corresponding thereto from a digital (embedded) version of the user manual for that particular vehicle make and model. Similarly, where a user revisits a chatbot related to a particular product offering or service, the RAG component 1192 may retrieve a prior stored conversation history—or at least a summary thereof—and include the prior conversation history along with the current ask/request as part of the input 1101 to the generative LM 1130.

The RAG component 1192 may use various RAG techniques. For example, naïve RAG may be used where documents are indexed, chunked, and applied to an embedding model to generate embeddings corresponding to the chunks. A user query may also be applied to the embedding model and/or another embedding model of the RAG component 1192 and the embeddings of the chunks along with the embeddings of the query may be compared to identify the most similar/related embeddings to the query, which may be supplied to the generative LM 1130 to generate an output.

In some embodiments, more advanced RAG techniques may be used. For example, prior to passing chunks to the embedding model, the chunks may undergo pre-retrieval processes (e.g., routing, rewriting, metadata analysis, expansion, etc.). In addition, prior to generating the final embeddings, post-retrieval processes (e.g., re-ranking, prompt compression, etc.) may be performed on the outputs of the embedding model prior to final embeddings being used as comparison to an input query.

As a further example, modular RAG techniques may be used, such as those that are similar to naïve and/or advanced RAG, but also include features such as hybrid search, recursive retrieval and query engines, StepBack approaches, sub-queries, and hypothetical document embedding.

As another example, Graph RAG may use knowledge graphs as a source of context or factual information. Graph RAG may be implemented using a graph database as a source of contextual information sent to the LLM/VLM/MMLM/etc. Rather than (or in addition to) providing the model with chunks of data extracted from larger sized documents—which may result in a lack of context, factual correctness, language accuracy, etc.—graph RAG may also provide structured entity information to the LLM/VLM/MMLM/etc. by combining the structured entity textual description with its many properties and relationships, allowing for deeper insights by the model. When implementing graph RAG, the systems and methods described herein use a graph as a content store and extract relevant chunks of documents and ask the LLM/VLM/MMLM/etc. to answer using them. The knowledge graph, in such embodiments, may contain relevant textual content and metadata about the knowledge graph as well as be integrated with a vector database. In some embodiments, the graph RAG may use a graph as a subject matter expert, where descriptions of concepts and entities relevant to a query/prompt may be extracted and passed to the model as semantic context. These descriptions may include relationships between the concepts. In other examples, the graph may be used as a database, where part of a query/prompt may be mapped to a graph query, the graph query may be executed, and the LLM/VLM/MMLM/etc. may summarize the results. In such an example, the graph may store relevant factual information, and a query (natural language query) to graph query tool ($N_L$-to-Graph-query tool) and entity linking may be used. In some embodiments, graph RAG (e.g., using a graph database) may be combined with standard (e.g., vector database) RAG, and/or other RAG types, to benefit from multiple approaches.

In any embodiments, the RAG component 1192 may implement a plugin, API, user interface, and/or other functionality to perform RAG. For example, a graph RAG plug-in may be used by the LLM/VLM/MMLM/etc. to run queries against the knowledge graph to extract relevant information for feeding to the model, and a standard or vector RAG plug-in may be used to run queries against a vector database. For example, the graph database may interact with a plug-in's REST interface such that the graph database is decoupled from the vector database and/or the embeddings models.

The tokenizer 1110 may segment the (e.g., processed) text data into smaller units (tokens) for subsequent analysis and processing. The tokens may represent individual words, subwords, characters, portions of audio/video/image/etc., depending on the implementation. Word-based tokenization divides the text into individual words, treating each word as a separate token. Subword tokenization breaks down words into smaller meaningful units (e.g., prefixes, suffixes, stems), enabling the generative LM 1130 to understand morphological variations and handle out-of-vocabulary words more effectively. Character-based tokenization represents each character as a separate token, enabling the generative LM 1130 to process text at a fine-grained level. The choice of tokenization strategy may depend on factors such as the language being processed, the task at hand, and/or characteristics of the training dataset. As such, the tokenizer 1110 may convert the (e.g., processed) text into a structured format according to tokenization schema being implemented in the particular embodiment.

The embedding component 1120 may use any known embedding technique to transform discrete tokens into (e.g., dense, continuous vector) representations of semantic meaning. For example, the embedding component 1120 may use pre-trained word embeddings (e.g., Word2Vec, GloVe, or FastText), one-hot encoding, Term Frequency-Inverse Document Frequency (TF-IDF) encoding, one or more embedding layers of a neural network, and/or otherwise.

In some implementations in which the input 1101 includes image data/video data/etc., the input processor 1101 may resize the data to a standard size compatible with format of a corresponding input channel and/or may normalize pixel values to a common range (e.g., 0 to 1) to ensure a consistent representation, and the embedding component 1120 may encode the image data using any known technique (e.g., using one or more convolutional neural networks (CNNs) to extract visual features). In some implementations in which the input 1101 includes audio data, the input processor 1101 may resample an audio file to a consistent sampling rate for uniform processing, and the embedding component 1120 may use any known technique to extract and encode audio features—such as in the form of a spectrogram (e.g., a mel-spectrogram). In some implementations in which the input 1101 includes video data, the input processor 1101 may extract frames or apply resizing to extracted frames, and the embedding component 1120 may extract features such as optical flow embeddings or video embeddings and/or may encode temporal information or sequences of frames. In some implementations in which the input 1101 includes multi-modal data, the embedding component 1120 may fuse representations of the different types of data (e.g., text, image, audio, USD, video, design, etc.) using techniques like early fusion (concatenation), late fusion (sequential processing), attention-based fusion (e.g., self-attention, cross-attention), etc.

The generative LM 1130 and/or other components of the generative LM system 1100 may use different types of neural network architectures depending on the implementation. For example, transformer-based architectures such as those used in models like GPT may be implemented, and may include self-attention mechanisms that weigh the importance of different words or tokens in the input sequence and/or feedforward networks that process the output of the self-attention layers, applying non-linear transformations to the input representations and extracting higher-level features. Some non-limiting example architectures include transformers (e.g., encoder-decoder, decoder only, multi-modal), RNNs, LSTMs, fusion models, diffusion models, cross-modal embedding models that learn joint embedding spaces, graph neural networks (GNNs), hybrid architectures combining different types of architectures adversarial networks like generative adversarial networks or GANs or adversarial autoencoders (AAEs) for joint distribution learning, and others. As such, depending on the implementation and architecture, the embedding component 1120 may apply an encoded representation of the input 1101 to the generative LM 1130, and the generative LM 1130 may process the encoded representation of the input 1101 to generate an output 1190, which may include responsive text and/or other types of data.

As described herein, in some embodiments, the generative LM 1130 may be configured to access or use—or capable of accessing or using—plug-ins/APIs 1195 (which may include one or more plug-ins, application programming interfaces (APIs), databases, data stores, repositories, etc.). For example, for certain tasks or operations that the generative LM 1130 is not ideally suited for, the model may have instructions (e.g., as a result of training, and/or based on instructions in a given prompt, such as those retrieved using the RAG component 1192) to access one or more plug-ins/APIs 1195 (e.g., 3rd party plugins) for help in processing the current input. In such an example, where at least part of a prompt is related to restaurants or weather, the model may access one or more restaurant or weather plug-ins (e.g., via one or more APIs), send at least a portion of the prompt related to the particular plug-in/API 1195 to the plug-in/API 1195, the plug-in/API 1195 may process the information and return an answer to the generative LM 1130, and the generative LM 1130 may use the response to generate the output 1190. This process may be repeated—e.g., recursively—for any number of iterations and using any number of plug-ins/APIs 1195 until an output 1190 that addresses each ask/question/request/process/operation/etc. from the input 1101 can be generated. As such, the model(s) may not only rely on its own knowledge from training on a large dataset(s) and/or from data retrieved using the RAG component 1192, but also on the expertise or optimized nature of one or more external resources-such as the plug-ins/APIs 1195.

Figure 11B:
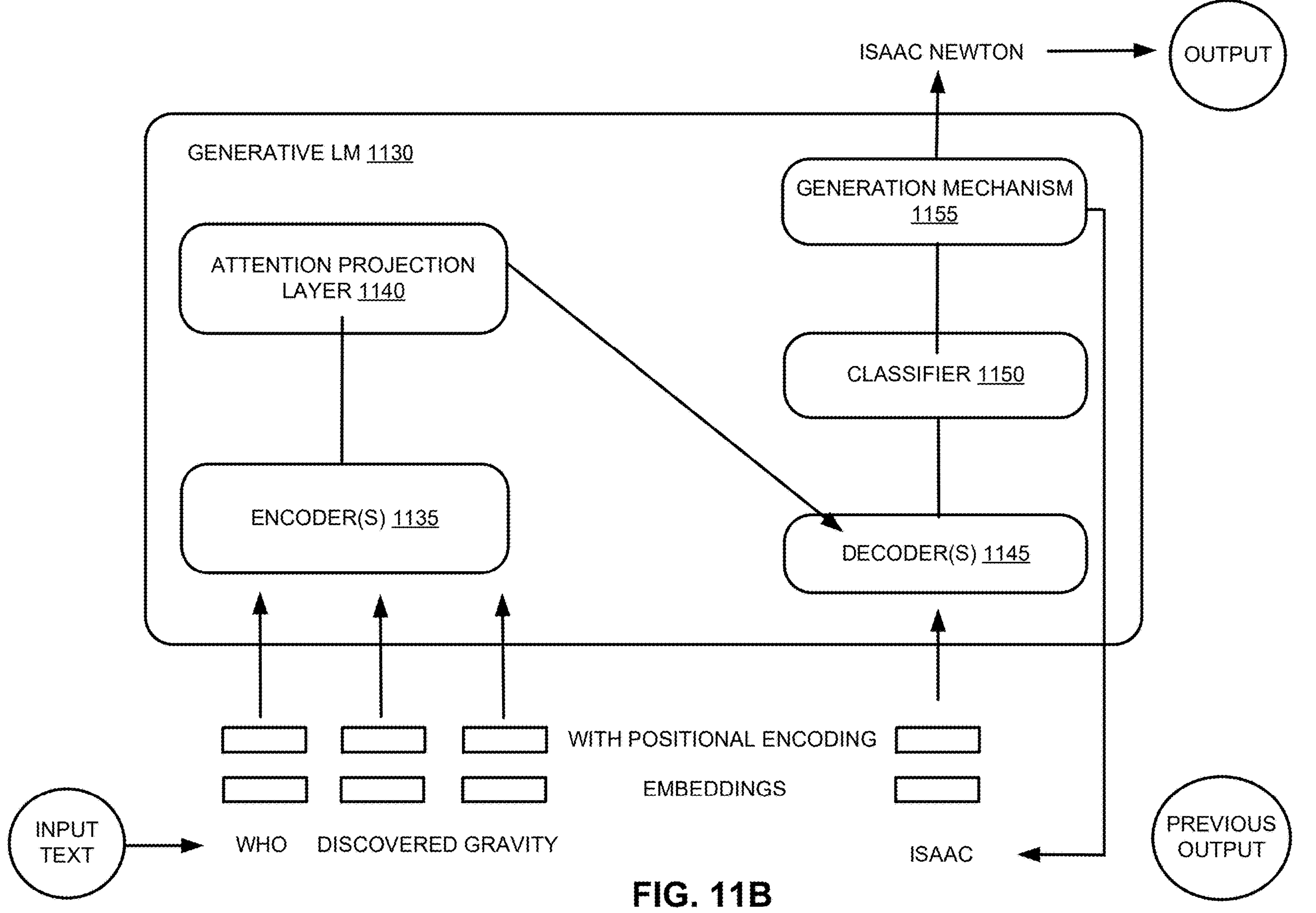
FIG. 11B is a block diagram of an example generative language model that includes a transformer encoder-decoder suitable for use in implementing at least some embodiments of the present disclosure.

FIG. 11B is a block diagram of an example implementation in which the generative LM 1130 includes a transformer encoder-decoder. For example, assume input text such as "Who discovered gravity" is tokenized (e.g., by the tokenizer 1110 of FIG. 11A) into tokens such as words, and each token is encoded (e.g., by the embedding component 1120 of FIG. 911A) into a corresponding embedding (e.g., of size 512). Since these token embeddings typically do not represent the position of the token in the input sequence, any known technique may be used to add a positional encoding to each token embedding to encode the sequential relationships and context of the tokens in the input sequence. As such, the (e.g., resulting) embeddings may be applied to one or more encoder(s) 1135 of the generative LM 1130.

In an example implementation, the encoder(s) 1135 forms an encoder stack, where each encoder includes a self-attention layer and a feedforward network. In an example transformer architecture, each token (e.g., word) flows through a separate path. As such, each encoder may accept a sequence of vectors, passing each vector through the self-attention layer, then the feedforward network, and then upwards to the next encoder in the stack. Any known self-attention technique may be used. For example, to calculate a self-attention score for each token (word), a query vector, a key vector, and a value vector may be created for each token, a self-attention score may be calculated for pairs of tokens by taking the dot product of the query vector with the corresponding key vectors, normalizing the resulting scores, multiplying by corresponding value vectors, and summing weighted value vectors. The encoder may apply multi-headed attention in which the attention mechanism is applied multiple times in parallel with different learned weight matrices. Any number of encoders may be cascaded to generate a context vector encoding the input. An attention projection layer 1140 may convert the context vector into attention vectors (keys and values) for the decoder(s) 1145.

In an example implementation, the decoder(s) 1145 form a decoder stack, where each decoder includes a self-attention layer, an encoder-decoder self-attention layer that uses the attention vectors (keys and values) from the encoder to focus on relevant parts of the input sequence, and a feedforward network. As with the encoder(s) 1135, in an example transformer architecture, each token (e.g., word) flows through a separate path in the decoder(s) 1145. During a first pass, the decoder(s) 1145, a classifier 1150, and a generation mechanism 1155 may generate a first token, and the generation mechanism 1155 may apply the generated token as an input during a second pass. The process may repeat in a loop, successively generating and adding tokens (e.g., words) to the output from the preceding pass and applying the token embeddings of the composite sequence with positional encodings as an input to the decoder(s) 1145 during a subsequent pass, sequentially generating one token at a time (known as auto-regression) until predicting a symbol or token that represents the end of the response. Within each decoder, the self-attention layer is typically constrained to attend only to preceding positions in the output sequence by applying a masking technique (e.g., setting future positions to negative infinity) before the softmax operation. In an example implementation, the encoder-decoder attention layer operates similarly to the (e.g., multi-headed) self-attention in the encoder(s) 1135, except that it creates its queries from the layer below it and takes the keys and values (e.g., matrix) from the output of the encoder(s) 1135.

As such, the decoder(s) 1145 may output some decoded (e.g., vector) representation of the input being applied during a particular pass. The classifier 1150 may include a multi-class classifier comprising one or more neural network layers that project the decoded (e.g., vector) representation into a corresponding dimensionality (e.g., one dimension for each supported word or token in the output vocabulary) and a softmax operation that converts logits to probabilities. As such, the generation mechanism 1155 may select or sample a word or token based on a corresponding predicted probability (e.g., select the word with the highest predicted probability) and append it to the output from a previous pass, generating each word or token sequentially. The generation mechanism 1155 may repeat the process, triggering successive decoder inputs and corresponding predictions until selecting or sampling a symbol or token that represents the end of the response, at which point, the generation mechanism 1155 may output the generated response.

Figure 11C:
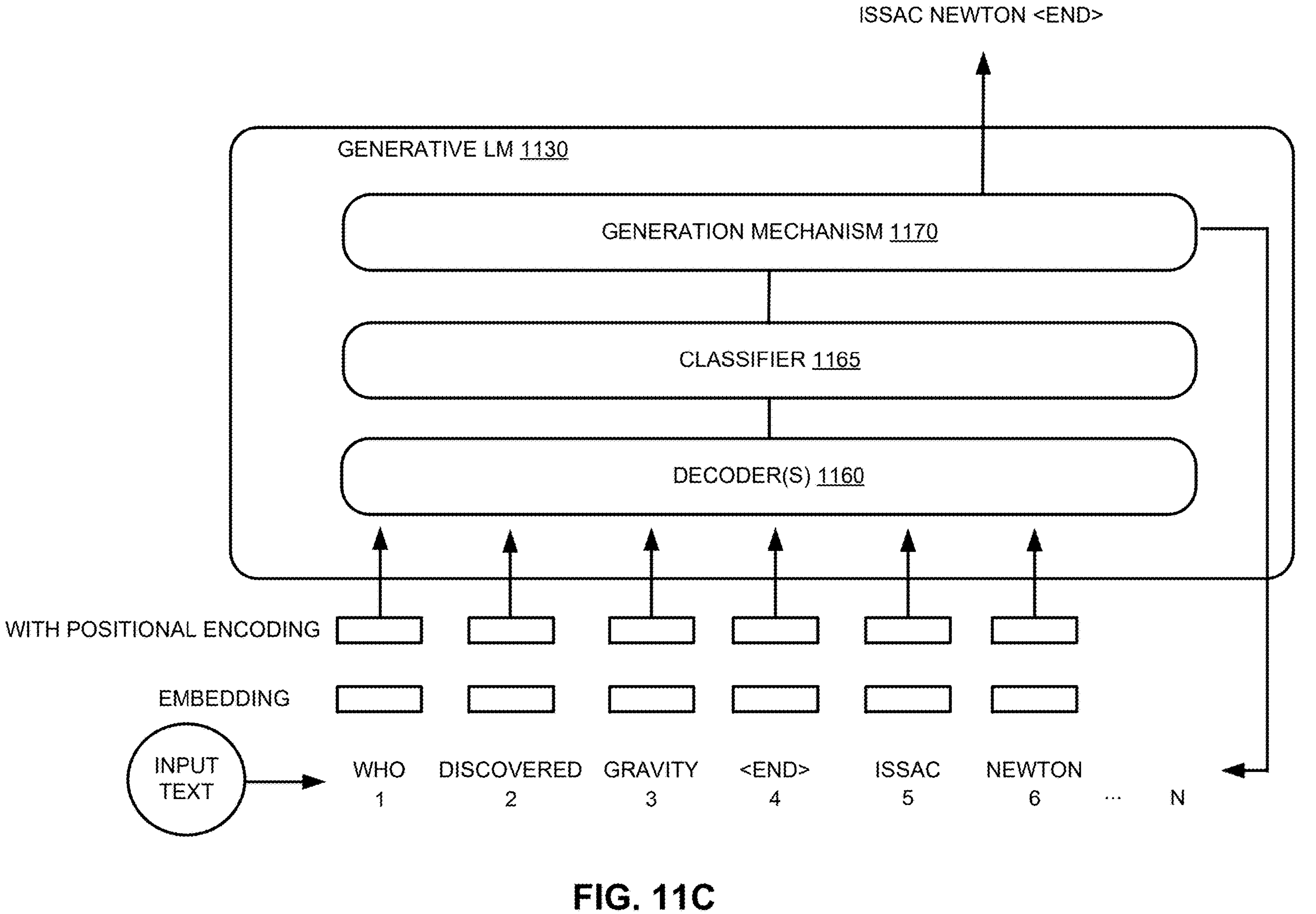
FIG. 11C is a block diagram of an example generative language model that includes a decoder-only transformer architecture suitable for use in implementing at least some embodiments of the present disclosure.

FIG. 11C is a block diagram of an example implementation in which the generative LM 1130 includes a decoder-only transformer architecture. For example, the decoder(s) 1160 of FIG. 11C may operate similarly as the decoder(s) 1145 of FIG. 11B except each of the decoder(s) 1160 of FIG. 11C omits the encoder-decoder self-attention layer (since there is no encoder in this implementation). As such, the decoder(s) 1160 may form a decoder stack, where each decoder includes a self-attention layer and a feedforward network. Furthermore, instead of encoding the input sequence, a symbol or token representing the end of the input sequence (or the beginning of the output sequence) may be appended to the input sequence, and the resulting sequence (e.g., corresponding embeddings with positional encodings) may be applied to the decoder(s) 1160. As with the decoder(s) 1145 of FIG. 11B, each token (e.g., word) may flow through a separate path in the decoder(s) 1160, and the decoder(s) 1160, a classifier 1165, and a generation mechanism 1170 may use auto-regression to sequentially generate one token at a time until predicting a symbol or token that represents the end of the response. The classifier 1165 and the generation mechanism 1170 may operate similarly as the classifier 1150 and the generation mechanism 1155 of FIG. 11B, with the generation mechanism 1170 selecting or sampling each successive output token based on a corresponding predicted probability and appending it to the output from a previous pass, generating each token sequentially until selecting or sampling a symbol or token that represents the end of the response. These and other architectures described herein are meant simply as examples, and other suitable architectures may be implemented within the scope of the present disclosure.

Example Computing Device

Figure 12:
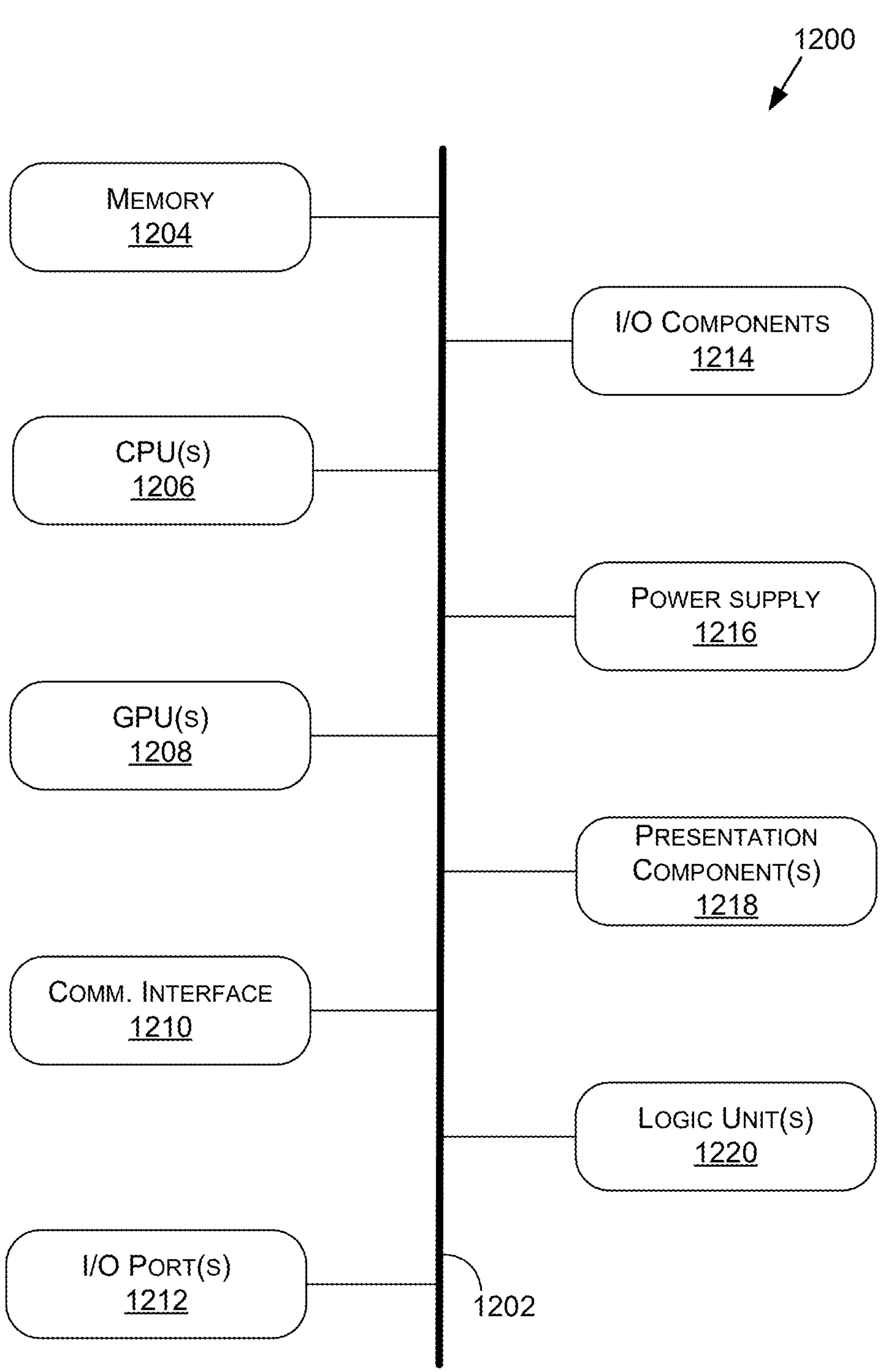
FIG. 12 is a block diagram of an example computing device suitable for use in implementing some embodiments of the present disclosure.

FIG. 12 is a block diagram of an example computing device(s) 1200 suitable for use in implementing some embodiments of the present disclosure. Computing device 1200 may include an interconnect system 1202 that directly or indirectly couples the following devices: memory 1204, one or more central processing units (CPUs) 1206, one or more graphics processing units (GPUs) 1208, a communication interface 1210, input/output (I/O) ports 1212, input/output components 1214, a power supply 1216, one or more presentation components 1218 (e.g., display(s)), and one or more logic units 1220. In at least one embodiment, the computing device(s) 1200 may comprise one or more virtual machines (VMs), and/or any of the components thereof may comprise virtual components (e.g., virtual hardware components). For non-limiting examples, one or more of the GPUs 1208 may comprise one or more vGPUs, one or more of the CPUs 1206 may comprise one or more vCPUs, and/or one or more of the logic units 1220 may comprise one or more virtual logic units. As such, a computing device(s) 1200 may include discrete components (e.g., a full GPU dedicated to the computing device 1200), virtual components (e.g., a portion of a GPU dedicated to the computing device 1200), or a combination thereof.

Although the various blocks of FIG. 12 are shown as connected via the interconnect system 1202 with lines, this is not intended to be limiting and is for clarity only. For example, in some embodiments, a presentation component 1218, such as a display device, may be considered an I/O component 1214 (e.g., if the display is a touch screen). As another example, the CPUs 1206 and/or GPUs 1208 may include memory (e.g., the memory 1204 may be representative of a storage device in addition to the memory of the GPUs 1208, the CPUs 1206, and/or other components). As such, the computing device of FIG. 12 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 12.

The interconnect system 1202 may represent one or more links or busses, such as an address bus, a data bus, a control bus, or a combination thereof. The interconnect system 1202 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1206 may be directly connected to the memory 1204. Further, the CPU 1206 may be directly connected to the GPU 1208. Where there is direct, or point-to-point connection between components, the interconnect system 1202 may include a PCIe link to carry out the connection. In these examples, a PCI bus need not be included in the computing device 1200.

The memory 1204 may include any of a variety of computer-readable media. The computer-readable media may be any available media that may be accessed by the computing device 1200. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1204 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1200. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1206 may be configured to execute at least some of the computer-readable instructions to control one or more components of the computing device 1200 to perform one or more of the methods and/or processes described herein. The CPU(s) 1206 may each include one or more cores (e.g., one, two, four, eight, twenty-eight, seventy-two, etc.) that are capable of handling a multitude of software threads simultaneously. The CPU(s) 1206 may include any type of processor, and may include different types of processors depending on the type of computing device 1200 implemented (e.g., processors with fewer cores for mobile devices and processors with more cores for servers). For example, depending on the type of computing device 1200, the processor may be an Advanced RISC Machines (ARM) processor implemented using Reduced Instruction Set Computing (RISC) or an x86 processor implemented using Complex Instruction Set Computing (CISC). The computing device 1200 may include one or more CPUs 1206 in addition to one or more microprocessors or supplementary co-processors, such as math co-processors.

In addition to or alternatively from the CPU(s) 1206, the GPU(s) 1208 may be configured to execute at least some of the computer-readable instructions to control one or more components of the computing device 1200 to perform one or more of the methods and/or processes described herein. One or more of the GPU(s) 1208 may be an integrated GPU (e.g., with one or more of the CPU(s) 1206 and/or one or more of the GPU(s) 1208 may be a discrete GPU. In embodiments, one or more of the GPU(s) 1208 may be a coprocessor of one or more of the CPU(s) 1206. The GPU(s) 1208 may be used by the computing device 1200 to render graphics (e.g., 3D graphics) or perform general purpose computations. For example, the GPU(s) 1208 may be used for General-Purpose computing on GPUs (GPGPU). The GPU(s) 1208 may include hundreds or thousands of cores that are capable of handling hundreds or thousands of software threads simultaneously. The GPU(s) 1208 may generate pixel data for output images in response to rendering commands (e.g., rendering commands from the CPU(s) 1206 received via a host interface). The GPU(s) 1208 may include graphics memory, such as display memory, for storing pixel data or any other suitable data, such as GPGPU data. The display memory may be included as part of the memory 1204. The GPU(s) 1208 may include two or more GPUs operating in parallel (e.g., via a link). The link may directly connect the GPUs (e.g., using NVLINK) or may connect the GPUs through a switch (e.g., using NVSwitch). When combined together, each GPU 1208 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1206 and/or the GPU(s) 1208, the logic unit(s) 1220 may be configured to execute at least some of the computer-readable instructions to control one or more components of the computing device 1200 to perform one or more of the methods and/or processes described herein. In embodiments, the CPU(s) 1206, the GPU(s) 1208, and/or the logic unit(s) 1220 may discretely or jointly perform any combination of the methods, processes and/or portions thereof. One or more of the logic units 1220 may be part of and/or integrated in one or more of the CPU(s) 1206 and/or the GPU(s) 1208 and/or one or more of the logic units 1220 may be discrete components or otherwise external to the CPU(s) 1206 and/or the GPU(s) 1208. In embodiments, one or more of the logic units 1220 may be a coprocessor of one or more of the CPU(s) 1206 and/or one or more of the GPU(s) 1208.

Examples of the logic unit(s) 1220 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Trec Traversal Units (TTUs), Artificial Intelligence Accelerators (AIAs), Deep Learning Accelerators (DLAs), Programmable Vision Accelerator (PVAs)—which may include one or more direct memory access (DMA) systems, one or more vision or vector processing units (VPUs), one or more pixel processing engines (PPEs), one or more decoupled accelerators (e.g., decoupled lookup table (DLUT) accelerators), etc., Vision Processing Units (VPUs), Optical Flow Accelerators (OFAs), Field Programmable Gate Arrays (FPGAs), Neuromorphic Chips, Quantum Processing Units (QPUs), Associative Process Units (APUs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1210 may include one or more receivers, transmitters, and/or transceivers that allow the computing device 1200 to communicate with other computing devices via an electronic communication network, included wired and/or wireless communications. The communication interface 1210 may include components and functionality to allow communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 1220 and/or communication interface 1210 may include one or more data processing units (DPUs) to transmit data received over a network and/or through interconnect system 1202 directly to (e.g., a memory of) one or more GPU(s) 1208.

The I/O ports 1212 may allow the computing device 1200 to be logically coupled to other devices including the I/O components 1214, the presentation component(s) 1218, and/or other components, some of which may be built in to (e.g., integrated in) the computing device 1200. Illustrative I/O components 1214 include a microphone, mouse, keyboard, joystick, game pad, game controller, satellite dish, scanner, printer, wireless device, etc. The I/O components 1214 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1200. The computing device 1200 may be include depth cameras, such as stereoscopic camera systems, infrared camera systems, RGB camera systems, touchscreen technology, and combinations of these, for gesture detection and recognition. Additionally, the computing device 1200 may include accelerometers or gyroscopes (e.g., as part of an inertia measurement unit (IMU)) that allow detection of motion. In some examples, the output of the accelerometers or gyroscopes may be used by the computing device 1200 to render immersive augmented reality or virtual reality.

The power supply 1216 may include a hard-wired power supply, a battery power supply, or a combination thereof. The power supply 1216 may provide power to the computing device 1200 to allow the components of the computing device 1200 to operate.

The presentation component(s) 1218 may include a display (e.g., a monitor, a touch screen, a television screen, a heads-up-display (HUD), other display types, or a combination thereof), speakers, and/or other presentation components. The presentation component(s) 1218 may receive data from other components (e.g., the GPU(s) 1208, the CPU(s) 1206, DPUs, etc.), and output the data (e.g., as an image, video, sound, etc.).

Example Data Center

Figure 13:
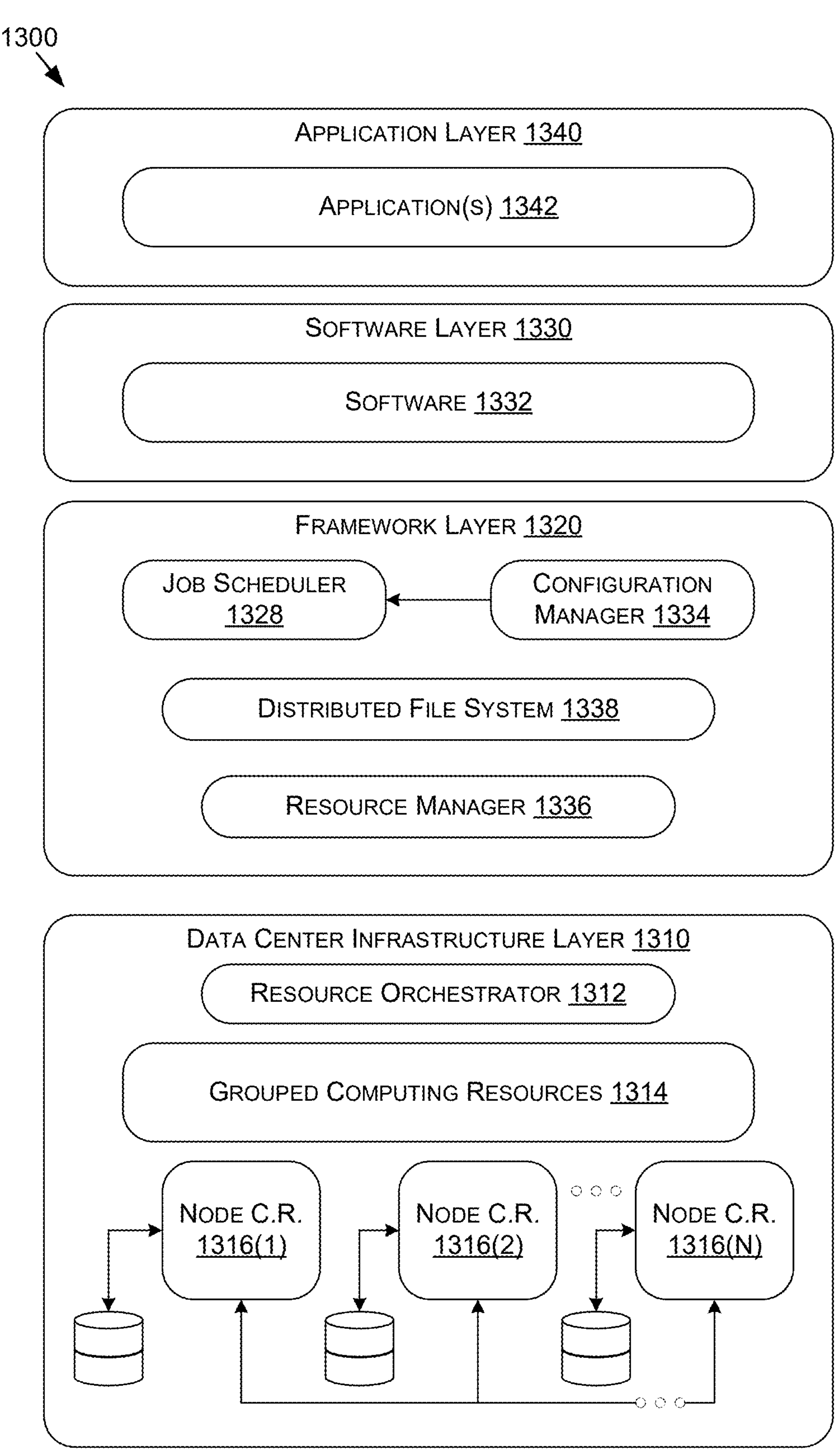
FIG. 13 is a block diagram of an example data center suitable for use in implementing some embodiments of the present disclosure.

FIG. 13 illustrates an example data center 1300 that may be used in at least one embodiments of the present disclosure. The data center 1300 may include a data center infrastructure layer 1310, a framework layer 1320, a software layer 1330, and/or an application layer 1340.

As shown in FIG. 13, the data center infrastructure layer 1310 may include a resource orchestrator 1312, grouped computing resources 1314, and node computing resources ("node C.R.s") 1316(1)-1316(N), where "N" represents any whole, positive integer. In at least one embodiment, node C.R.s 1316(1)-1316(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1316(1)-1316(N) may correspond to a server having one or more of the above-mentioned computing resources. In addition, in some embodiments, the node C.R.s 1316(1)-13161 (N) may include one or more virtual components, such as vGPUs, vCPUs, and/or the like, and/or one or more of the node C.R.s 1316(1)-1316(N) may correspond to a virtual machine (VM).

In at least one embodiment, grouped computing resources 1314 may include separate groupings of node C.R.s 1316 housed within one or more racks (not shown), or many racks housed in data centers at various geographical locations (also not shown). Separate groupings of node C.R.s 1316 within grouped computing resources 1314 may include grouped compute, network, memory or storage resources that may be configured or allocated to support one or more workloads. In at least one embodiment, several node C.R.s 1316 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1312 may configure or otherwise control one or more node C.R.s 1316(1)-1316(N) and/or grouped computing resources 1314. In at least one embodiment, resource orchestrator 1312 may include a software design infrastructure (SDI) management entity for the data center 1300. The resource orchestrator 1312 may include hardware, software, or some combination thereof.

In at least one embodiment, as shown in FIG. 13, framework layer 1320 may include a job scheduler 1328, a configuration manager 1334, a resource manager 1336, and/or a distributed file system 1338. The framework layer 1320 may include a framework to support software 1332 of software layer 1330 and/or one or more application(s) 1342 of application layer 1340. The software 1332 or application(s) 1342 may respectively include web-based service software or applications, such as those provided by Amazon Web Services, Google Cloud and Microsoft Azure. The framework layer 1320 may be, but is not limited to, a type of free and open-source software web application framework such as Apache Spark™ (hereinafter "Spark") that may use distributed file system 1338 for large-scale data processing (e.g., "big data"). In at least one embodiment, job scheduler 1328 may include a Spark driver to facilitate scheduling of workloads supported by various layers of data center 1300. The configuration manager 1334 may be capable of configuring different layers such as software layer 1330 and framework layer 1320 including Spark and distributed file system 1338 for supporting large-scale data processing. The resource manager 1336 may be capable of managing clustered or grouped computing resources mapped to or allocated for support of distributed file system 1338 and job scheduler 1328. In at least one embodiment, clustered or grouped computing resources may include grouped computing resource 1314 at data center infrastructure layer 1310. The resource manager 1336 may coordinate with resource orchestrator 1312 to manage these mapped or allocated computing resources.

In at least one embodiment, software 1332 included in software layer 1330 may include software used by at least portions of node C.R.s 1316(1)-1316(N), grouped computing resources 1314, and/or distributed file system 1338 of framework layer 1320. One or more types of software may include, but are not limited to, Internet web page search software, e-mail virus scan software, database software, and streaming video content software.

In at least one embodiment, application(s) 1342 included in application layer 1340 may include one or more types of applications used by at least portions of node C.R.s 1316(1)-1316(N), grouped computing resources 1314, and/or distributed file system 1338 of framework layer 1320. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1334, resource manager 1336, and resource orchestrator 1312 may implement any number and type of self-modifying actions based on any amount and type of data acquired in any technically feasible fashion. Self-modifying actions may relieve a data center operator of data center 1300 from making possibly bad configuration decisions and possibly avoiding underutilized and/or poor performing portions of a data center.

The data center 1300 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1300. In at least one embodiment, trained or deployed machine learning models corresponding to one or more neural networks may be used to infer or predict information using resources described above with respect to the data center 1300 by using weight parameters calculated through one or more training techniques, such as but not limited to those described herein.

In at least one embodiment, the data center 1300 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1200 of FIG. 12—e.g., each device may include similar components, features, and/or functionality of the computing device(s) 1200. In addition, where backend devices (e.g., servers, NAS, etc.) are implemented, the backend devices may be included as part of a data center 1300, an example of which is described in more detail herein with respect to FIG. 13.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1200 described herein with respect to FIG. 12. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

Other variations are within the spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, a number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transforms that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as a system may embody one or more methods and methods may be considered a system.

In the present document, references may be made to obtaining, acquiring, receiving, or inputting analog or digital data into a subsystem, computer system, or computer-implemented machine. In at least one embodiment, a process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example embodiments of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:

storing a plurality of documents in a network-based store (NBS), wherein the NBS comprises a plurality of stages, an individual stage of the plurality of stages comprising one or more matrix multiplications and one or more non-linear activations, wherein storing one or more documents of the plurality of documents comprises:

modifying one or more parameters of matrix multiplications of at least one stage of the plurality of stages;

processing, using the NBS, a query to obtain one or more retrieved documents associated with the query, wherein an individual retrieved document of the one or more retrieved documents at least approximately reproduces a document of the plurality of documents; and obtaining a language model prompt based at least on the query and the one or more retrieved documents.

2. The method of claim 1, wherein the plurality of stages of the NBS comprises a label stage determined using:

a plurality of auxiliary labels;

a plurality of hidden states, wherein an individual hidden state of the plurality of hidden states is determined by a matrix multiplication of a first label matrix and a corresponding label of the plurality of auxiliary labels, wherein storing the one or more documents comprises using the plurality of hidden states.

3. The method of claim 2, wherein an individual label of the plurality of auxiliary labels comprises bits of a first bit value and $N_L$ bits of a second bit value, and wherein $N_L-k$ is at least ten times greater than k.

4. The method of claim 2, wherein elements of the first label matrix are randomly sampled from a reference distribution.

5. The method of claim 2, wherein the plurality of stages of the NBS comprises a feature stage, the feature stage comprising:

a matrix multiplication of a feature matrix and a document feature associated with an individual document of the plurality of documents, wherein the feature matrix is determined using:

the plurality of hidden states; and at least a subset of the plurality of documents.

6. The method of claim 5, wherein a dimension of the document feature is larger than a dimension of the individual hidden state.

7. The method of claim 5, wherein processing the query to obtain the one or more retrieved documents comprises:

processing, using the feature matrix, a query feature to obtain a hidden encoded state for the query;

processing, using a second label matrix, the hidden encoded state for the query to obtain a label state for the query;

processing, using the first label matrix, the label state for the query to obtain a hidden decoded state for the query; and processing, using a return feature matrix, the hidden decoded state for the query to obtain a retrieved feature associated with the individual retrieved document.

8. The method of claim 1, wherein modifying the one or more parameters of matrix multiplications is performed using at least one of Hebbian learning or pseudoinverse learning.

9. The method of claim 1, wherein a number of the plurality of documents is less than a threshold number and the individual retrieved document exactly reproduces the document.

10. The method of claim 1, wherein a number of the plurality of documents is above a threshold number and the individual retrieved document approximately reproduces the document, an error of reproduction being an increasing function of the number of the plurality of documents.

11. The method of claim 1, wherein storing an individual document of the plurality of documents comprises:

segmenting the individual document into a plurality of segments;

causing an embedding model to process the plurality of segments to generate a plurality of embeddings; and using the plurality of embeddings as an input into the NBS.

12. The method of claim 1, wherein storing the plurality of documents comprises:

identifying a set of auxiliary labels;

generating elements of a first label matrix;

generating a set of hidden states, wherein an individual hidden state of the set of hidden states is generated using a matrix multiplication of the first label matrix and an individual auxiliary label of the set of auxiliary labels;

generating, using the set of hidden states, a hidden state matrix;

representing the plurality of documents via a set of document features; and storing the plurality of documents encoded via elements of a feature matrix generated using the hidden state matrix and the set of document features.

13. A system comprising:

one or more processors to:

modify one or more parameters of a network-based store (NBS) in response to storing at least one document in the NBS, wherein the NBS comprises a plurality of stages associated with one or more matrix multiplications and one or more non-linear activations;

process, using the NBS, a query to obtain one or more retrieved documents that at least approximately reproduce a document of a plurality of documents stored in the NBS; and augment, based at least on the one or more retrieved documents, the query for a machine learning model.

14. The system of claim 13, wherein the plurality of stages of the NBS comprises a label stage determined using:

a plurality of auxiliary labels;

a plurality of hidden states, wherein an individual hidden state of the plurality of hidden states is determined by a matrix multiplication of a first label matrix and a corresponding label of the plurality of auxiliary labels, wherein the at least one document is stored using at least one hidden state of the plurality of hidden states.

15. The system of claim 14, wherein elements of the first label matrix are randomly sampled from a reference distribution.

16. The system of claim 14, wherein the plurality of stages of the NBS comprises a feature stage, the feature stage comprising:

a matrix multiplication of a feature matrix and a document feature associated with an individual document of the plurality of documents, wherein the feature matrix is determined using:

the plurality of hidden states; and at least a subset of the plurality of documents.

17. The system of claim 16, wherein to process the query to obtain the one or more retrieved documents, the one or more processors are to:

process, using the feature matrix, a query feature to obtain a hidden encoded state for the query;

process, using a second label matrix, the hidden encoded state for the query to obtain a label state for the query;

process, using the first label matrix, the label state for the query to obtain a hidden decoded state for the query; and process, using a return feature matrix, the hidden decoded state for the query to obtain a retrieved feature associated with the individual retrieved document.

18. The system of claim 13, wherein to store the at least one document, the one or more processors are to:

identify a set of auxiliary labels;

generate elements of a first label matrix;

generate a set of hidden states, wherein an individual hidden state of the set of hidden states is generated using a matrix multiplication of the first label matrix and an individual auxiliary label of the set of auxiliary labels;

generate, using the set of hidden states, a hidden state matrix;

represent the plurality of documents via a set of document features; and store the at least one document encoded via elements of a feature matrix generated using the hidden state matrix and the set of document features.

19. The system of claim 13, wherein the system is comprised in at least one of:

an in-vehicle infotainment system for an autonomous or semi-autonomous machine;

a system for performing simulation operations;

a system for performing digital twin operations;

a system for performing light transport simulation;

a system for performing one or more medical operations;

a system for performing one or more factory operations;

a system for performing one or more analytics operations;

a system implementing one or more inference microservices;

a system for performing collaborative content creation for 3D assets;

a system for performing deep learning operations;

a system implemented using an edge device;

a system for generating or presenting at least one of virtual reality content, mixed reality content, or augmented reality content;

a system implemented using a robot;

a system for performing one or more conversational AI operations;

a system implementing one or more large language models (LLMs);

a system implementing one or more vision language models (VLMs);

a system implementing one or more multi-modal language models;

a system implementing one or more language models;

a system for performing one or more generative AI operations;

a system for generating synthetic data;

a system incorporating one or more virtual machines (VMs);

a system implemented at least partially in a data center; or a system implemented at least partially using cloud computing resources.

20. A non-transitory computer-readable storage medium storing instructions that, when executed by a processing device, cause the processing device to:

maintain a network-based store (NBS) with a plurality of stages, wherein one or more parameters of at least one stage of the plurality of stages are modified when at least one document is stored in the NBS;

process, using the NBS, a query to obtain one or more document features associated with the query, wherein an individual document feature of the one or more document features at least approximately reproduces a document stored in the NBS; and generate a prompt to a language model based at least on the query and the one or more document features.

* * * * *